US011654308B2

(12) United States Patent
Misra et al.

(10) Patent No.: US 11,654,308 B2
(45) Date of Patent: *May 23, 2023

(54) SELF-CONTAINED BREATHING APPARATUS WITH THERMAL IMAGING CAPABILITIES

(71) Applicant: MSA Technology, LLC, Cranberry Township, PA (US)

(72) Inventors: Kaustubh Misra, Pittsburgh, PA (US); Michael F. Becker, Wexford, PA (US); Henry A. Fonzi, III, Cranberry Township, PA (US); David E. Garrett, Wexford, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 344 days.

This patent is subject to a terminal disclaimer.

(21) Appl. No.: 16/995,216

(22) Filed: Aug. 17, 2020

(65) Prior Publication Data

US 2020/0376307 A1 Dec. 3, 2020

Related U.S. Application Data

(63) Continuation of application No. 15/131,866, filed on Apr. 18, 2016, now Pat. No. 10,773,108.

(Continued)

(51) Int. Cl.
*A62B 9/00* (2006.01)
*A62B 7/00* (2006.01)
(Continued)

(52) U.S. Cl.
CPC ............ *A62B 9/006* (2013.01); *A62B 7/02* (2013.01); *A62B 7/04* (2013.01); *A62B 18/02* (2013.01); *G01J 5/025* (2013.01); *G01J 5/10* (2013.01); *H04N 5/2257* (2013.01); *H04N 5/33* (2013.01); *G01J 2005/0077* (2013.01)

(58) Field of Classification Search
CPC .......... A62B 9/006; A62B 7/04; A62B 18/02; A62B 7/02; A62B 9/00; A62B 9/022; A62B 9/02; A62B 9/027; A62B 18/00–082; A62B 21/00; A62B 25/00; A62B 7/00;
(Continued)

(56) References Cited

U.S. PATENT DOCUMENTS 4,841,953 A * 6/1989 Dodrill ................... A62B 9/04
128/205.24
4,970,589 A 11/1990 Hanson et al.
(Continued)

FOREIGN PATENT DOCUMENTS

CN 1640510 A 7/2009
CN 202092779 U 12/2011
(Continued)

OTHER PUBLICATIONS

Operating Manual—G1 SCBA, MSA the Safety Company, 2014. pp. 1-99, http://s7d9.scene7.com/is/content/minesafetyappliances/Operating_Manual_G1_SCBA_NFPA_CBRN_10158406.

*Primary Examiner* — Tu A Vo
(74) *Attorney, Agent, or Firm* — Jones Day

(57) ABSTRACT

An improved safety device for a self-contained breathing apparatus, and an improved self-contained breathing apparatus having thermal imaging capabilities.

20 Claims, 18 Drawing Sheets

Related U.S. Application Data

(60) Provisional application No. 62/150,055, filed on Apr. 20, 2015.

(51) Int. Cl.
| | |
|---|---|
| *A62B 18/00* | (2006.01) |
| *G01J 5/10* | (2006.01) |
| *G01J 5/00* | (2022.01) |
| *H04N 5/33* | (2023.01) |
| *A62B 7/04* | (2006.01) |
| *A62B 7/02* | (2006.01) |
| *A62B 18/02* | (2006.01) |
| *G01J 5/02* | (2022.01) |
| *H04N 5/225* | (2006.01) |

(58) Field of Classification Search
CPC ...... H04N 5/2257; H04N 5/2254; H04N 5/33; G01J 5/025; G01J 5/10; G01J 2005/0077
See application file for complete search history.

(56) References Cited

U.S. PATENT DOCUMENTS

| | | | |
|---|---|---|---|
| 6,016,160 A | 1/2000 | Coombs et al. | |
| 6,255,650 B1 | 7/2001 | Warner et al. | |
| 6,606,114 B1 * | 8/2003 | Gordon | A42B 3/042 348/64 |
| 7,095,025 B2 | 8/2006 | Reilly et al. | |
| 7,105,796 B2 | 9/2006 | Lewis et al. | |
| 7,263,379 B1 * | 8/2007 | Parkulo | A62B 9/006 370/254 |
| 7,369,174 B2 * | 5/2008 | Olita | G02B 27/0176 348/E5.025 |
| 7,460,304 B1 * | 12/2008 | Epstein | G02B 27/017 359/356 |
| 8,279,544 B1 | 10/2012 | O'Neill | |
| 2003/0058100 A1 | 3/2003 | Jumpertz | |
| 2003/0058544 A1 | 3/2003 | Bianco et al. | |
| 2003/0122958 A1 | 7/2003 | Olita et al. | |
| 2005/0127296 A1 * | 6/2005 | Reilly | A42B 3/042 D29/103 |
| 2005/0167590 A1 | 8/2005 | Miyano et al. | |
| 2007/0181129 A1 | 8/2007 | Mattinson et al. | |
| 2010/0081411 A1 | 4/2010 | Montenero | |
| 2010/0219956 A1 | 9/2010 | Greco et al. | |
| 2013/0242110 A1 | 9/2013 | Terre et al. | |
| 2015/0121684 A1 | 5/2015 | Kuutti et al. | |
| 2015/0273248 A1 | 10/2015 | Kuutti et al. | |
| 2015/0283409 A1 | 10/2015 | Buck | |
| 2016/0081415 A1 * | 3/2016 | Handshaw | A42B 3/046 2/5 |
| 2017/0123211 A1 | 5/2017 | Lavoie | |

FOREIGN PATENT DOCUMENTS

| | | | |
|---|---|---|---|
| CN | 202614386 U | 12/2012 | |
| GB | 2380044 A | 3/2003 | |
| WO | WO-2005016046 A1 * | 2/2005 | ............. A62B 18/08 |
| WO | WO-2005072827 A1 * | 8/2005 | ........... A62B 17/006 |
| WO | 2014145030 A2 | 9/2014 | |

\* cited by examiner

SELF-CONTAINED BREATHING APPARATUS WITH THERMAL IMAGING CAPABILITIES

CROSS REFERENCE TO RELATED APPLICATIONS

This application is a continuation application of U.S. application Ser. No. 15/131,866, filed on Apr. 18, 2016, entitled "Self-Contained Breathing Apparatus With Thermal Imaging Capabilities", which claims priority to U.S. Provisional Application No. 62/150,055, filed on Apr. 20, 2015, entitled "Safety Device for a Self-Contained Breathing Apparatus (SCBA) Arrangement", the entire contents of which are hereby incorporated by reference.

BACKGROUND OF THE INVENTION

Field of the Invention

This invention relates generally to self-contained breathing apparatus, and more specifically, a self-contained breathing apparatus with a safety device, e.g., a personal alert safety system.

Description of Related Art

As is known in the art, a self-contained breathing apparatus (SCBA) is used in a variety of situations and environments where a user requires breathing air, e.g., firefighting situations, low- or no-air environments, emergency applications, and/or the like. One such SCBA is shown and described in the *Operating Manual—G1 SCBA* of MSA (which is incorporated herein by reference, and a copy of which may be found at the following link: http://s7d9.scene7.com/is/content/minesafetyappliances/Operating Manual G1 SCBA NFPA CBRN 101584 06).

One known SCBA is illustrated in schematic form in FIG. 1. As can be seen, the SCBA includes at least one air cylinder (AC) that is filled with compressed air for delivery to a mask (M), which is donned by a user prior to entering the affected situation or environment. In particular, the air from the air cylinder (AC) is regulated by a first regulator module (RM1) and delivered through an air hose (AH) to a control module (CM) and a second regulator module (RM2) connectable to the mask (M). In this manner, regulated air is supplied to the internal area of the mask (M) for consumption by the user.

Currently, the control module (CM) includes, is integrated with, or is associated with a processor (P), which is programmed or configured to directly or indirectly communicate with and/or control one or more of the components of the SCBA. A power device (PD) is provided to provide power to one or more of the components of the SCBA. Further, data communications and/or electrical power may be distributed to or through the components of the SCBA using a power/communication line (CL). In addition, a communication device (CD), such as a short-range and/or long range radio device, is included and is in direct or indirect communication with the processor (P), and this communication device (CD) is programmed or configured to facilitate direct and/or indirect, wired and/or wireless data communications.

Also included in this known SCBA is a safety device (SD), which may be referred to as a personal alert safety system (PASS), a distress signal unit (DSU), an automatic distress signal unit (ADSU), or the like. This safety device (SD) is used to alert the first responder/firefighter as to the status of their SCBA. Generally, the safety device (SD) provides visual, aural, and/or tactile information regarding the pressure in the air cylinder (AC), available time based upon current usage, alarms warning about low pressure conditions, leaks, and/or other errors or faults in the system. One primary function of the safety device (SD) is entry into an alarm state when the user has not moved for a set period of time. This situation may be considered a "man-down" alarm. Various systems have been used to determine such a "man-down" condition, such that one or more motion sensors, e.g., accelerometers, gyroscopes, rotational sensors, and/or the like, can be integrated or associated with the safety device (SD), such that the "man-down" condition may be determined based upon the motion data provided by or derived from the motion sensors.

In certain applications, e.g., firefighting, the user may also carry a separate portable thermal imaging camera, which allows the user to ascertain the infrared signature of the scene. These units are designed to create an image on an LCD/LED screen to show the user features that are normally not visible to the naked eye, such as "hot spots" behind walls or closed doors, an image of the fire scene that may be obscured by smoke or haze (thereby preventing the scene from being viewed in the visual part of the light wavelength spectrum), and/or the like. In use, the user must first find the separate thermal imaging camera on his/her person (and amongst all of the other equipment that is being worn) in the smoky, hazy, and emergency environment.

Accordingly, there is a need in the art for an improved SCBA and an improved safety device having thermal imaging capabilities.

SUMMARY OF THE INVENTION

Generally, the present invention provides an improved safety device and an improved self-contained breathing apparatus (SCBA). Preferably, the present invention provides an improved safety device and an improved SCBA that combines or integrates features of a safety (e.g., alarm) device and a thermal imaging camera.

According to one preferred and non-limiting embodiment or aspect, provided is a safety device for a self-contained breathing apparatus having at least one air cylinder configured to deliver regulated air through an air hose via a first regulator module; and a mask configured to be worn by a user, the mask having a second regulator module configured to deliver air from an air hose to an internal area of the mask, the safety device comprising: an air pressure gauge configured to indicate air pressure information or data to the user; a thermal imaging unit comprising: (i) at least one lens having a field-of-view; and (ii) at least one thermal sensor configured to output signals representative of thermal energy; and a user interface programmed or configured to display information or data to the user; wherein at least one local or remote processor is programmed or configured to directly or indirectly communicate with and/or control at least one of the following: the air pressure gauge, the thermal imaging unit, the user interface, or any combination thereof.

In one preferred and non-limiting embodiment or aspect, the safety device further comprises at least one alarm system programmed or configured to generate alarm data based upon input data from at least one of the following: at least one component of the self-contained breathing apparatus, at least one component of the safety device, or any combination thereof. In another preferred and non-limiting embodiment or aspect, the at least one alarm system comprises at least one alarm member comprising at least one of the following: a structural element configured to receive input from at least one user to generate alarm data; a lighting element configured to provide visual alarm data to the at least one user when in an alarm mode, a speaker element configured to provide aural alarm data to the at least one user when in alarm mode, or any combination thereof. In another preferred and non-limiting embodiment or aspect, the safety device further comprises at least one motion sensor programmed or configured to generate motion data, wherein, based at least partially on the motion data, the at least one alarm system at least one of enters an alarm mode and generates alarm data. In another preferred and non-limiting embodiment or aspect, based at least partially on the output signals from the thermal imaging unit, the at least one alarm system at least one of enters an alarm mode and generates alarm data.

In one preferred and non-limiting embodiment or aspect, the safety device further comprises at least one infrared light emitting member configured to emit infrared light, which may be received or sensed by another safety device. In another preferred and non-limiting embodiment or aspect, the infrared light is emitted in at least one of the following: a strobe pattern, a specified pattern, a configurable pattern, a user-controlled pattern, or any combination thereof.

In one preferred and non-limiting embodiment or aspect, the safety device further comprises at least one control element programmed or configured to facilitate direct or indirect interaction with or control of at least one component of the safety device.

In one preferred and non-limiting embodiment or aspect, the safety device further comprises at least one communication interface programmed or configured to transmit, receive, and/or process at signals in at least one of the following manners: directly, indirectly, wirelessly, over a communication line, or any combination thereof. In another preferred and non-limiting embodiment or aspect, the at least one processor is local to the safety device and programmed or configured to process and transmit, via the at least one communication interface, at least one of the following: thermal imaging data, alarm data, alarm mode data, motion data, safety device data, user data, or any combination thereof.

In one preferred and non-limiting embodiment or aspect, the safety device further comprises a housing having at least one wall or rim at least partially surrounding at least one of the following: the air pressure gauge, the user interface, at least one control element programmed or configured to facilitate direct or indirect interaction with or control of at least one component of the safety device, or any combination thereof.

In one preferred and non-limiting embodiment or aspect, the at least one lens is oriented in a direction substantially parallel with a longitudinal length of a housing of the safety device.

In one preferred and non-limiting embodiment or aspect, the at least one lens is oriented in a direction of $\pm X°$ along a horizontal plane extending through a longitudinal length of a housing of the safety device, wherein X is in the range of about 0 to about 45.

In one preferred and non-limiting embodiment or aspect, the orientation of the at least one lens is at least one of the following: manually adjustable by the user, automatically adjustable, automatically adjustable using the user interface, automatically adjustable using at least one control element, or any combination thereof.

In one preferred and non-limiting embodiment or aspect, the at least one lens is adjustable in a direction of $\pm Y°$ along a vertical plane extending through a longitudinal length of a housing of the safety device, wherein Y is in the range of about 0 to about 90.

In one preferred and non-limiting embodiment or aspect, the safety device further comprises a housing having at least one shield configured to at least partially surround the at least one lens.

In one preferred and non-limiting embodiment or aspect, the information or data displayed on the user interface can be modified by at least one of the following: the user's movement of the safety device, the user's voice command, or any combination thereof.

In one preferred and non-limiting embodiment or aspect, the at least one processor is programmed or configured to initiate at least one of a no-power or low-power state based at least partially on at least one of the following: a specified movement of the user, a voice command of the user, a specified orientation of the safety device, a specified period of a specified orientation, a specified period of non-use or non-interaction, a specified period of non-use or non-interaction of a specified component of the safety device, or any combination thereof.

In one preferred and non-limiting embodiment or aspect, the at least one processor is programmed or configured to initiate a power-on or power-up state based at least partially on at least one of the following: a specified movement of the user, a voice command of the user, a specified orientation of the safety device, a specified period of a specified orientation, use of or interaction with the safety device, use of or interaction with a specified component of the safety device, or any combination thereof.

In one preferred and non-limiting embodiment or aspect, the at least one processer comprises at least one of the following: an existing processor of the safety device, an existing processor of the thermal imaging unit, a remote processor in direct or indirect communication with the safety device, an existing processor of at least one component of the self-contained breathing apparatus, an existing processor of a control module of the self-contained breathing apparatus.

According to one preferred and non-limiting embodiment or aspect, provided is a self-contained breathing apparatus, comprising: at least one air cylinder configured to deliver regulated air through an air hose via a first regulator module; a mask configured to be worn by a user, the mask having a second regulator module configured to deliver air from an air hose to an internal area of the mask; a control module, including: (i) a power device configured to provide power to at least one component of the self-contained breathing apparatus; (ii) a processor programmed or configured to communicate with and/or control at least one component of the self-contained breathing apparatus; and (iii) a communication device programmed or configured to facilitate direct and/or indirect, wired and/or wireless data communications between the processor and the at least one component of the self-contained breathing apparatus; and a safety device comprising: an air pressure gauge configured to indicate air pressure information or data to the user; a thermal imaging unit comprising: (i) at least one lens having a field-of-view; and (ii) at least one thermal sensor configured to output signals representative of thermal energy; and a user interface positioned on a housing of the safety device and programmed or configured to display information or data to the user; wherein at least one local or remote processor is programmed or configured to directly or indirectly communicate with and/or control at least one of the following: the air pressure gauge, the thermal imaging unit, the user interface, or any combination thereof.

In one preferred and non-limiting embodiment or aspect, the at least one local or remote processor comprises the processor of the control module, and wherein the processor of the control module communicates with or controls at least one component of the safety device.

In one preferred and non-limiting embodiment or aspect, at least one component of the safety device is powered by the power device of the control module.

Further preferred and non-limiting embodiment or aspects will now be described in the following numbered clauses:

Clause 1: A safety device for a self-contained breathing apparatus having at least one air cylinder configured to deliver regulated air through an air hose via a first regulator module; and a mask configured to be worn by a user, the mask having a second regulator module configured to deliver air from an air hose to an internal area of the mask, the safety device comprising: an air pressure gauge configured to indicate air pressure information or data to the user; a thermal imaging unit comprising: (i) at least one lens having a field-of-view; and (ii) at least one thermal sensor configured to output signals representative of thermal energy; and a user interface programmed or configured to display information or data to the user; wherein at least one local or remote processor is programmed or configured to directly or indirectly communicate with and/or control at least one of the following: the air pressure gauge, the thermal imaging unit, the user interface, or any combination thereof.

Clause 2: The safety device of clause 1, further comprising at least one alarm system programmed or configured to generate alarm data based upon input data from at least one of the following: at least one component of the self-contained breathing apparatus, at least one component of the safety device, or any combination thereof.

Clause 3: The safety device of clause 2 or 3, wherein the at least one alarm system comprises at least one alarm member comprising at least one of the following: a structural element configured to receive input from at least one user to generate alarm data; a lighting element configured to provide visual alarm data to the at least one user when in an alarm mode, a speaker element configured to provide aural alarm data to the at least one user when in alarm mode, or any combination thereof.

Clause 4: The safety device of any of clauses 1-3, further comprising at least one motion sensor programmed or configured to generate motion data, wherein, based at least partially on the motion data, the at least one alarm system at least one of enters an alarm mode and generates alarm data.

Clause 5: The safety device of any of clauses 1-4, wherein, based at least partially on the output signals from the thermal imaging unit, the at least one alarm system at least one of enters an alarm mode and generates alarm data.

Clause 6: The safety device of any of clauses 1-5, further comprising at least one infrared light emitting member configured to emit infrared light, which may be received or sensed by another safety device.

Clause 7: The safety device of any of clauses 1-6, wherein the infrared light is emitted in at least one of the following: a strobe pattern, a specified pattern, a configurable pattern, a user-controlled pattern, or any combination thereof.

Clause 8: The safety device of any of clauses 1-7, further comprising at least one control element programmed or configured to facilitate direct or indirect interaction with or control of at least one component of the safety device.

Clause 9: The safety device of any of clauses 1-8, further comprising at least one communication interface programmed or configured to transmit, receive, and/or process signals in at least one of the following manners: directly, indirectly, wirelessly, over a communication line, or any combination thereof.

Clause 10: The safety device of any of clauses 1-9, wherein the at least one processor is local to the safety device and programmed or configured to process and transmit, via the at least one communication interface, at least one of the following: thermal imaging data, alarm data, alarm mode data, motion data, safety device data, user data, or any combination thereof.

Clause 11: The safety device of any of clauses 1-10, further comprising a housing having at least one wall or rim at least partially surrounding at least one of the following: the air pressure gauge, the user interface, at least one control element programmed or configured to facilitate direct or indirect interaction with or control of at least one component of the safety device, or any combination thereof.

Clause 12: The safety device of any of clauses 1-11, wherein the at least one lens is oriented in a direction substantially parallel with a longitudinal length of a housing of the safety device.

Clause 13: The safety device of any of clauses 1-12, wherein the at least one lens is oriented in a direction of ±X° along a horizontal plane extending through a longitudinal length of a housing of the safety device, wherein X is in the range of about 0 to about 45.

Clause 14: The safety device of any of clauses 1-13, wherein the orientation of the at least one lens is at least one of the following: manually adjustable by the user, automatically adjustable, automatically adjustable using the user interface, automatically adjustable using at least one control element, or any combination thereof.

Clause 15: The safety device of any of clauses 1-14, wherein the at least one lens is adjustable in a direction of ±Y° along a vertical plane extending through a longitudinal length of a housing of the safety device, wherein Y is in the range of about 0 to about 90.

Clause 16: The safety device of any of clauses 1-15, further comprising a housing having at least one shield configured to at least partially surround the at least one lens.

Clause 17: The safety device of any of clauses 1-16, wherein the information or data displayed on the user interface can be modified by at least one of the following: the user's movement of the safety device, the user's voice command, or any combination thereof.

Clause 18: The safety device of any of clauses 1-17, wherein the at least one processor is programmed or configured to initiate at least one of a no-power or low-power state based at least partially on at least one of the following: a specified movement of the user, a voice command of the user, a specified orientation of the safety device, a specified period of a specified orientation, a specified period of non-use or non-interaction, a specified period of non-use or non-interaction of a specified component of the safety device, or any combination thereof.

Clause 19: The safety device of any of clauses 1-18, wherein the at least one processor is programmed or configured to initiate a power-on or power-up state based at least partially on at least one of the following: a specified movement of the user, a voice command of the user, a specified orientation of the safety device, a specified period of a specified orientation, use of or interaction with the safety device, use of or interaction with a specified component of the safety device, or any combination thereof.

Clause 20: The safety device of any of clauses 1-19, wherein the at least one processer comprises at least one of the following: an existing processor of the safety device, an existing processor of the thermal imaging unit, a remote processor in direct or indirect communication with the safety device, an existing processor of at least one component of the self-contained breathing apparatus, an existing processor of a control module of the self-contained breathing apparatus.

Clause 21: A self-contained breathing apparatus, comprising: at least one air cylinder configured to deliver regulated air through an air hose via a first regulator module; a mask configured to be worn by a user, the mask having a second regulator module configured to deliver air from an air hose to an internal area of the mask; a control module, including: (i) a power device configured to provide power to at least one component of the self-contained breathing apparatus; (ii) a processor programmed or configured to communicate with and/or control at least one component of the self-contained breathing apparatus; and (iii) a communication device programmed or configured to facilitate direct and/or indirect, wired and/or wireless data communications between the processor and the at least one component of the self-contained breathing apparatus; and a safety device comprising: an air pressure gauge configured to indicate air pressure information or data to the user; a thermal imaging unit comprising: (i) at least one lens having a field-of-view; and (ii) at least one thermal sensor configured to output signals representative of thermal energy; and a user interface positioned on a housing of the safety device and programmed or configured to display information or data to the user; wherein at least one local or remote processor is programmed or configured to directly or indirectly communicate with and/or control at least one of the following: the air pressure gauge, the thermal imaging unit, the user interface, or any combination thereof.

Clause 22: The self-contained breathing apparatus of clause 21, wherein the at least one local or remote processor comprises the processor of the control module, and wherein the processor of the control module communicates with or controls at least one component of the safety device.

Clause 23: The self-contained breathing apparatus of clause 21 or 22, wherein at least one component of the safety device is powered by the power device of the control module.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
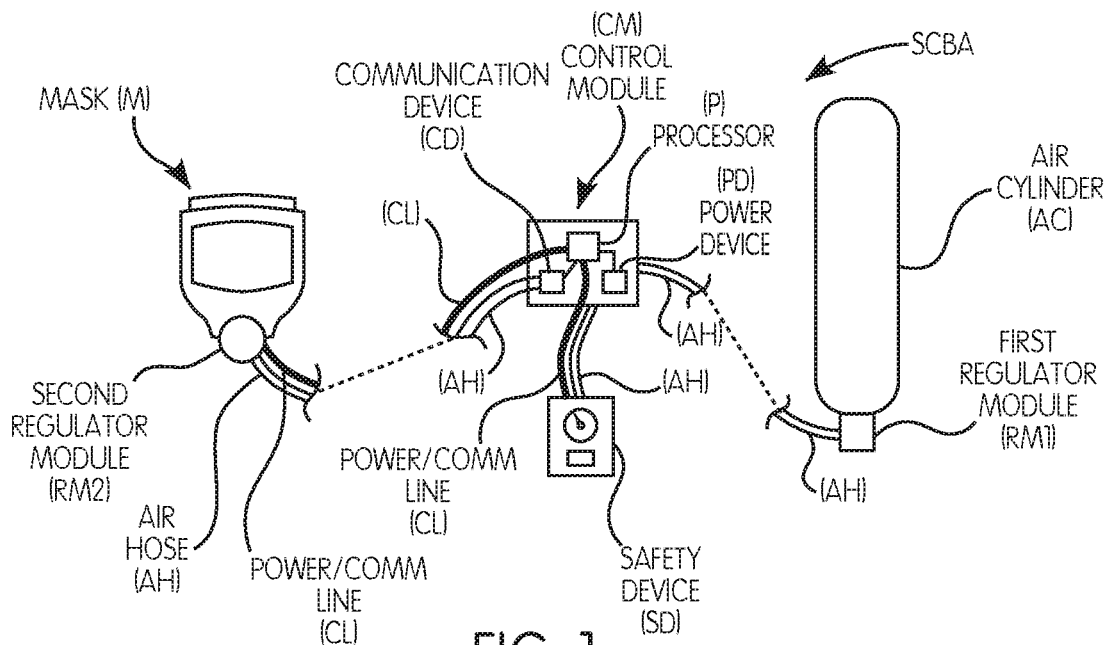
FIG. 1 is a schematic diagram of an existing self-contained breathing apparatus.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
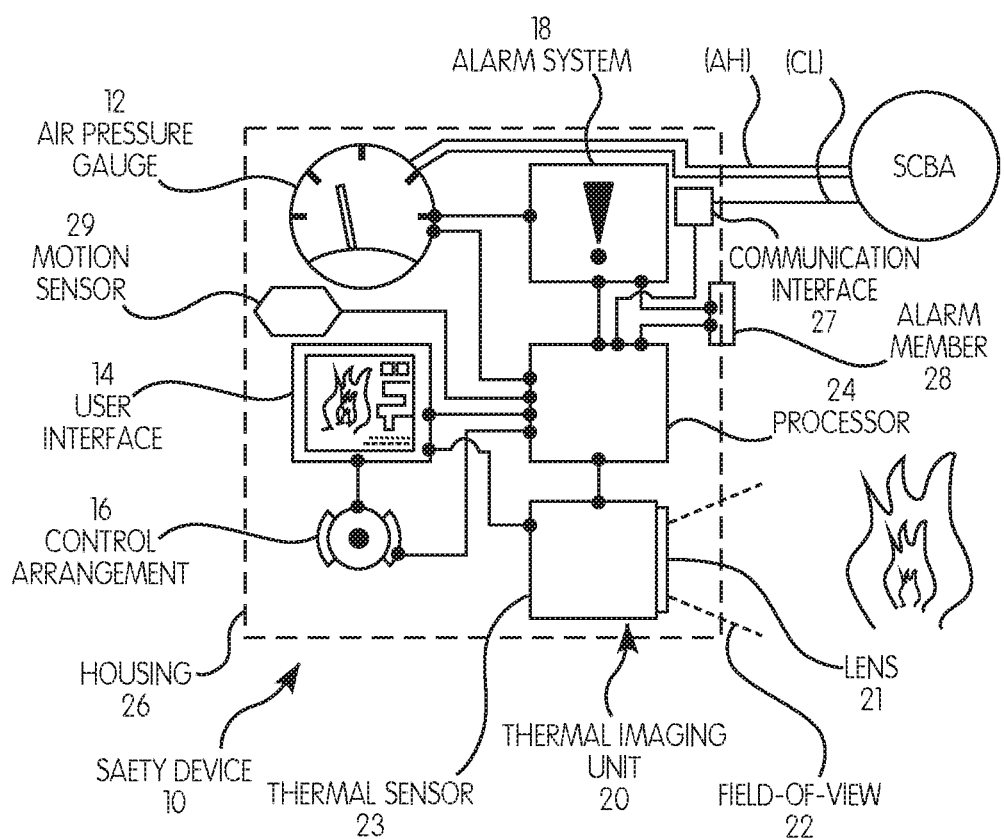
FIG. 2 is a schematic view of one embodiment of a safety device for a self-contained breathing apparatus according to the principles of the present invention.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like In one preferred and non-limiting embodiment or aspect, and as illustrated in schematic form in FIG. 2, provided is safety device 10 that can be used in connection and/or integrated with a self-contained breathing apparatus (SCBA), such as the SCBA discussed above and illustrated in FIG. 1. As shown in the preferred and non-limiting embodiment or aspect of FIG. 2, the safety device 10 includes an air pressure gauge 12 configured to indicate air pressure information or data to the user, such as the air pressure (or "air level") in the air cylinder (AC). The air pressure is determined by connecting the air hose (AH) to the safety device 10, either directly or indirectly from the air cylinder (AC) and/or a fitting on the control module (CM). In this manner, the safety device 10 receives or determines the air pressure in the air cylinder (AC) and displays this information to the user, preferably on the air pressure gauge 12.

Further, and in another preferred and non-limiting embodiment or aspect, the safety device 10 includes a user interface 14 (e.g., a LCD screen, a LED screen, an interactive screen, a touch screen, a display mechanism, a display device, and/or the like) programmed or configured to display information or data to the user. This user interface may be positioned in a variety of locations or positions on a housing 26 of the safety device 10.

In another preferred and non-limiting embodiment or aspect, the safety device 10 includes a thermal imaging unit 20 having at least one lens 21 with a field-of-view 22 and at least one thermal sensor 23 configured to output signals representative of thermal energy. Accordingly, the signals output from the thermal sensor 23 can be used to generate thermal imaging data for display on the user interface 14. As is known, this thermal imaging data provides a color (or other graphical element) based image of the thermal energy in the field-of-view 22. The at least one thermal sensor may include or be in the form of at least one of the following: at least one array, at least one focal plane array, at least one pixel array, at least one thermal imaging sensor, at least one thermocouple, at least one thermal image device, at least one thermal imaging unit, at least one temperature sensor, or any combination thereof.

In another preferred and non-limiting embodiment or aspect, at least one local or remote processor 24 (e.g., a computer, a computing device, a PLC, a circuit, and/or the like) is provided and programmed or configured to directly or indirectly communicate with and/or control at least one of the following: the air pressure gauge 12, the user interface 14, the thermal imaging unit 20, or any combination thereof. In particular, with continued reference to FIG. 2, and in one preferred and non-limiting embodiment or aspect, the processor 24 may be located in the safety device 10 (i.e., a "local" processor), and in another preferred and non-limiting embodiment or aspect, the processor 24 may be located remotely from the safety device 10, such as by using the processor (P) of the control module (CM) communicating over the power/communication line (CL) (or alternatively, communicating wirelessly with the control module (CM), or even wirelessly with some central unit or processor). Further, and in another preferred and non-limiting embodiment or aspect, the at least one processer 24 includes or is in the form of: an existing processor of the safety device 10 (e.g., the existing processor of an alarm/safety device with which the thermal imaging unit 20 is integrated), an existing processor of the thermal imaging unit 20 (e.g., an existing processor included with the at least one thermal sensor 23 and at least one lens 21 as a pre-packaged unit), a remote processor in direct or indirect communication with the safety device 10, an existing processor of at least one component of the SCBA, an existing processor (P) of the control module (CM) of the SCBA, and/or the like.

In one preferred and non-limiting embodiment or aspect, the safety device 10 includes or is in the form of at least one alarm system 18, which is programmed or configured to generate alarm data based upon input data from at least one component of the SCBA and/or at least one component of the safety device 10. Accordingly, the at least one alarm system 18 is controlled by or integrated with the processor 24 (or processor (P)). In one preferred and non-limiting embodiment or aspect, the alarm system 18 includes one or more alarm members 28, which may be in the form of one or more of the following: a structural element that can be actuated or engaged by the user to generate alarm data (e.g., a visual alarm, an aural alarm, a tactile alarm, a transmittal of at least a portion of the alarm data, and/or the like); a lighting element that provides visual alarm data to the user when in alarm mode; a speaker element that provides aural alarm data and/or signals to another device, e.g., a device in the mask (M) of the user, or any combination thereof.

In addition, and with continued reference to FIG. 2, the alarm system 18 (and/or the processor 24 or processor (P)) may include or be in direct or indirect communication with at least one motion sensor 29, which provides or generates motion data that may be used to generate or determine alarm data. This motion data and/or alarm data can be used to place the safety device 10 in alarm mode, and further, this motion data and/or alarm data can be transmitted to the control module (CM), such that the communication device (CD) of the control module (CM) can transmit the information or data to a remote unit, such as a central controller, e.g., central command at an incident scene. It is envisioned that the motion sensor 29 may be a rotational sensor, an accelerometer, a gyroscope, and/or the like. Further, it is this motion sensor 29 that can be used to sense or determine a "man-down" situation, where the alarm system 18 can generate the appropriate alarm data for use in a notification function or a rescue operation.

Similarly, the safety device 10 and/or the alarm system 18 can enter alarm mode (or generate alarm data) based at least partially on the output signals (and/or thermal imaging data) generated by or based upon the thermal imaging unit 20. For example, the output signals or thermal imaging data can be used to determine that the user is too close to or about to enter an extreme temperature environment. The determination of temperature intensity (which is based upon a determination of thermal energy associated with certain pixels or areas in the field-of-view 22) may be used to enter alarm mode, such as where the determined value is above a specified threshold. Further, this information and data may be periodically or automatically transmitted to some remote processor, e.g., a central processor or controller. In one preferred and non-limiting embodiment or aspect, this transmission may occur directly, e.g., wirelessly, between the safety device 10 and the remote processor and/or indirectly between the safety device 10 and the remote processor, such as by transmission from the safety device 10 to the control module (CM) (e.g., over the power/communication line (CL), wherein the control module (CM) transmits this information or data to the remote processor using the communication device (CD) of the control module (CM).

In another preferred and non-limiting embodiment or aspect, the safety device 10 includes at least one communication interface 27, which is programmed or configured to transmit, receive, and/or process signals directly, indirectly, wirelessly, over a communication line, e.g., power/communication line (CL), and/or the like. This at least one communication interface 27 may be in direct or indirect communication with or controlled by the processor 24, and further, may provide for the communication between the safety device 10 and the control module (CM), i.e., the processor (P) of the control module (CM). Accordingly, in one preferred and non-limiting embodiment or aspect, the at least one processor 24 is local to the safety device 10 and programmed or configured to process and transmit, via the at least one communication interface 27, at least one of the following: thermal imaging data, alarm data, alarm mode data, motion data, safety device data, user data, or any combination thereof. Again, this information and data may be transmitted to the control module (CM) over the power/communication line (CL) and/or to some other remote system.

In addition, some or all of the components of the safety device 10 are attached to, located within, integrated with, and/or associated with a housing 26, which is sized and shaped so as to be held and operated by the user while engaged in the desired activity. In one preferred and non-limiting embodiment or aspect, the safety device 10 includes at least one control arrangement 16 (e.g., a button, a touch interface, a joystick, an actuating member, a scroll member, and/or the like) programmed or configured to facilitate direct or indirect interaction with or control of the user interface 14. For example, the at least one control arrangement 16 can be positioned on or associated with the housing 26.

Figure 3:
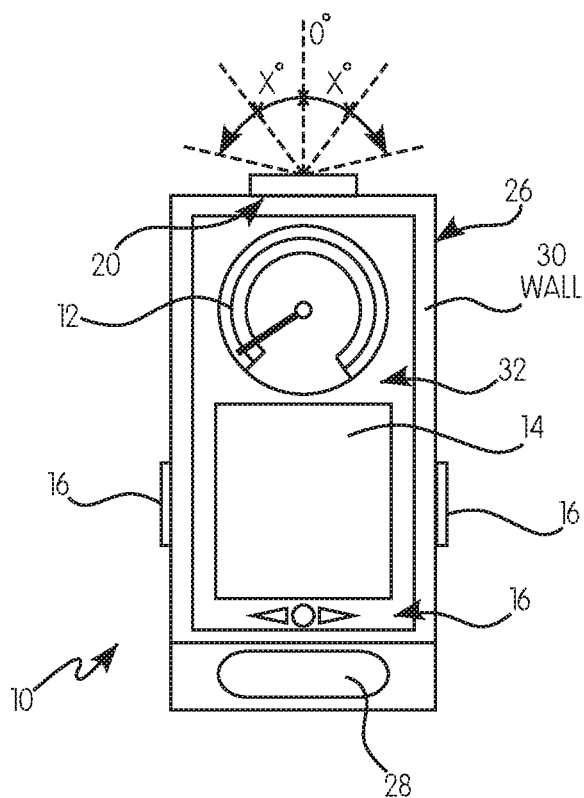
FIG. 3 is a schematic side view of another embodiment of a safety device for an a self-contained breathing apparatus according to the principles of the present invention.

In one preferred and non-limiting embodiment or aspect, and referring to FIG. 3, one or more walls 30 may be positioned on or integrated with the housing 26, such as the face 32 (or front area) of the housing 26. These walls 30 may at least partially surround one or more of the components on the face 32 of the housing 26, such as the air pressure gauge 12, the user interface 14, one or more of the control arrangements 16, and/or any other component of the safety device 10. In one application, the walls 30 provide a projecting rim that can help shield some or all of these components so the user can more easily view the air pressure gauge 12, the user interface 14, and/or the like. In another embodiment, at least a portion of the walls 30 are sized, shaped, and/or coated to facilitate viewing through the mask (M) by the user. In some embodiments, the walls 30 are sized, shaped, and/or coated to facilitate contact with the face shield of the mask (M), which would provide optimal viewing advantages. Alternatively, some or all of the safety device 10 can be positioned in a sleeve or boot (not shown), which would provide additional protection of the various components of the safety device 10, e.g., the air pressure gauge 12, the user interface 14, the control arrangements 16, portions of the thermal imaging unit 20, and/or the like. Such a sleeve or boot would provide a rugged, sealed cover for the safety device 10, which would be beneficial in many environments and applications in which the safety device 10 is employed.

It should be recognized that the user interface 14 may be used to display any of the information or data that is generated by, related to, or associated with any component of the SCBA, including the safety device 10. Therefore, the user interface 14 may display any information or data (in raw and/or processed form) that is generated by or derived from any of the following: the mask (M), the control module (CM), the air cylinder (AC), the safety device 10, the air pressure gauge 12, a control arrangement 16, the alarm system 18, the thermal imaging unit 20, the processor 24, the motion sensor 29, the alarm member 28, or any combination thereof.

As is known, first responders spend at least a portion of their time on their hands and knees while engaged in their activities, e.g., firefighting, because it reduces the exposure of the responder to high temperatures, as well as allows a safer ingress/egress from the scene. When in this position/orientation, the responder is less likely to trip and fall, or encounter unknown obstacles in a dangerous fashion. Accordingly, and in one preferred and non-limiting embodiment, and with reference to FIG. 4, the thermal imaging unit 20 includes a lens 21 that is oriented at an angle that is optimized to allow the user to view the scene, while still maintaining the most beneficial body position to simultaneously view the air pressure gauge 12 and/or the user interface 14 (which would display the visual data that is generated by the thermal imaging unit 20). In one preferred and non-limiting embodiment or aspect, the lens 21 (i.e., the field-of-view 22) is oriented in a direction substantially parallel with a longitudinal length of the housing 26, which provides an optimal orientation when the user is in the crawling position.

In one preferred and non-limiting embodiment or aspect, and as illustrated in FIG. 3, the lens 21 may be oriented at an angle $\pm X°$ with respect to the horizontal (or longitudinal) length (i.e., 0° of the safety device 10, e.g., the housing 26, where X may be less than or equal to 45, and preferably less than or equal to 30, and more preferably less than or equal to 15. In addition, this optimal angle may be a result of manufacturing or rigidly positioning the thermal imaging unit 20 and/or the lens 21 in a set, i.e., non-adjustable, position, which requires the user to move the entire safety device 10 to change the field-of-view 22. It should also be recognized that the thermal imaging unit 20 and/or the lens 21 may be rigidly or adjustably oriented at an angle $\pm Y°$ with respect to vertical (i.e., 0°), as illustrated in FIG. 4, where Y may be less than or equal to 90, and preferably less than or equal to 60, and more preferably less than or equal to 30.

Figure 4:
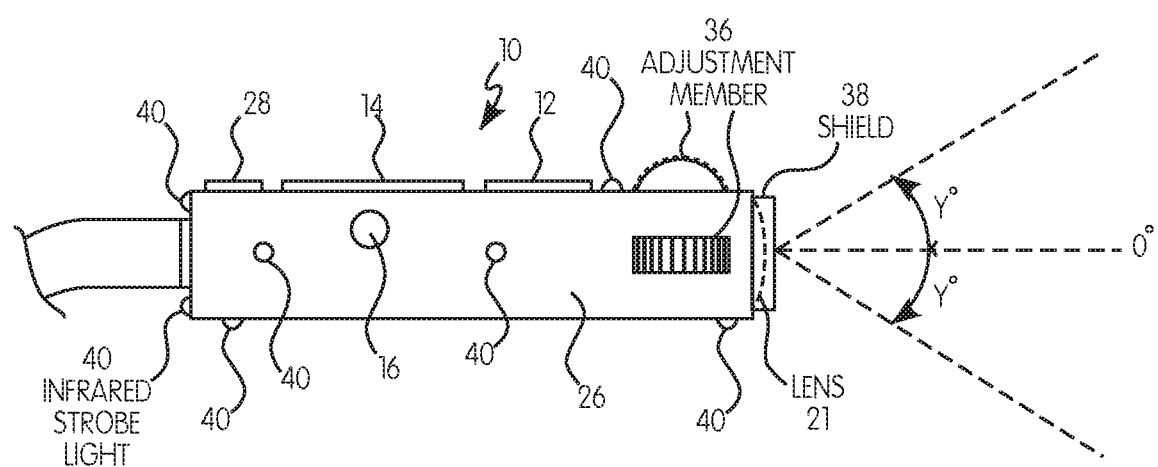
FIG. 4 is a schematic plan view of a further embodiment of a safety device for an a self-contained breathing apparatus according to the principles of the present invention.
Figure 5:
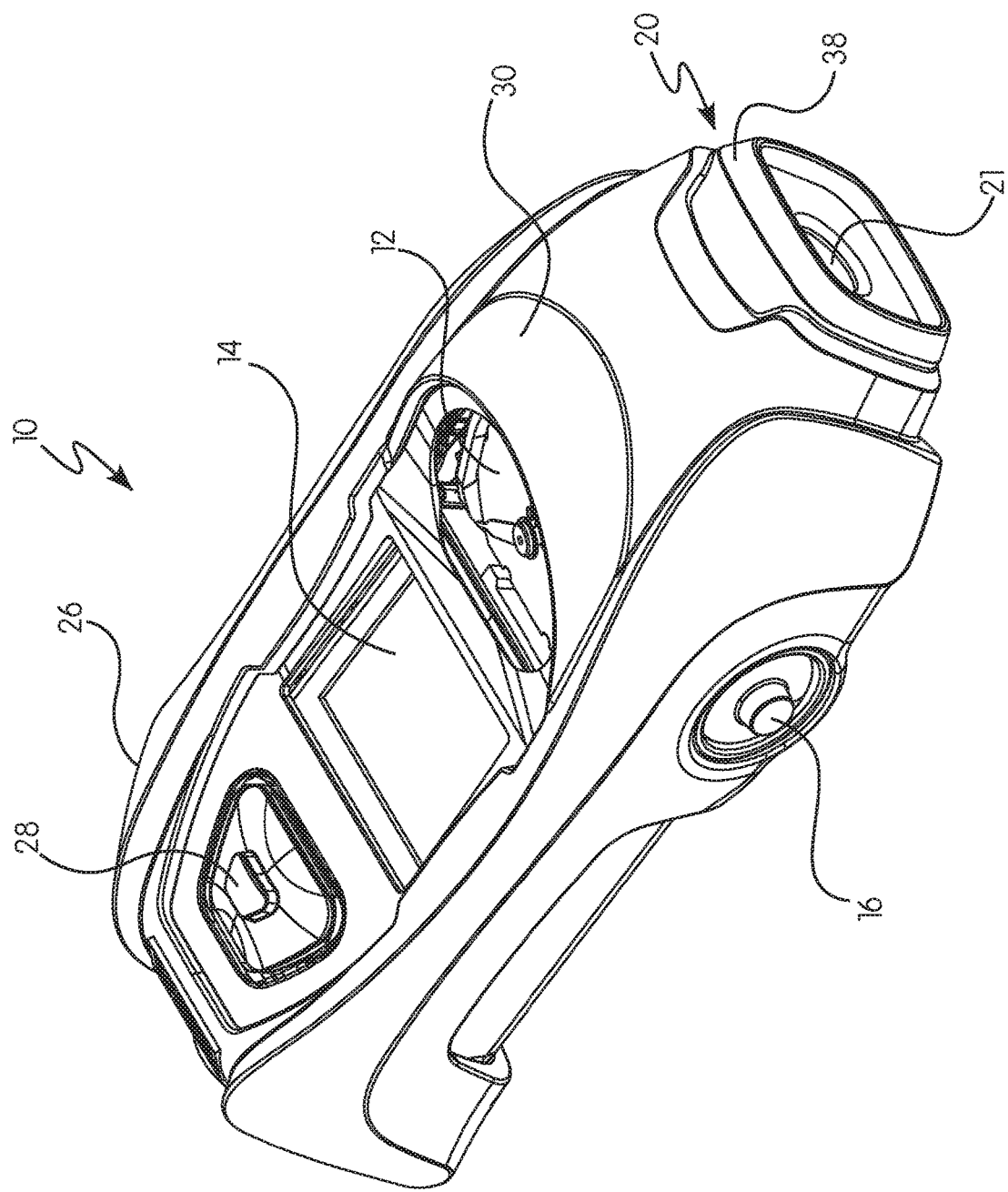
FIGS. 5-12 are isometric and cross sectional views of a further embodiment of a safety device for a self-contained breathing apparatus according to the principles of the present invention.
Figure 6:
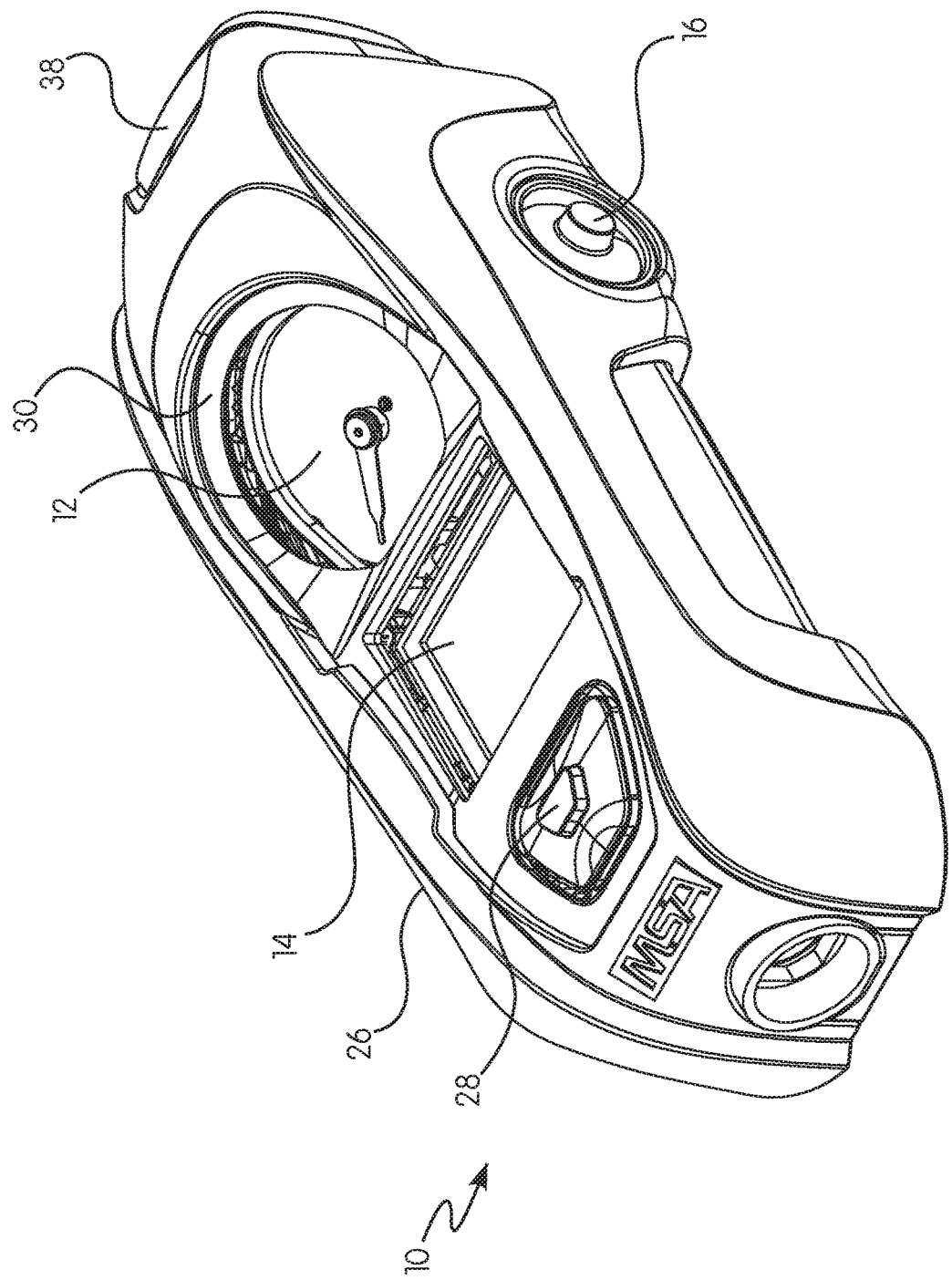
Figure 7:
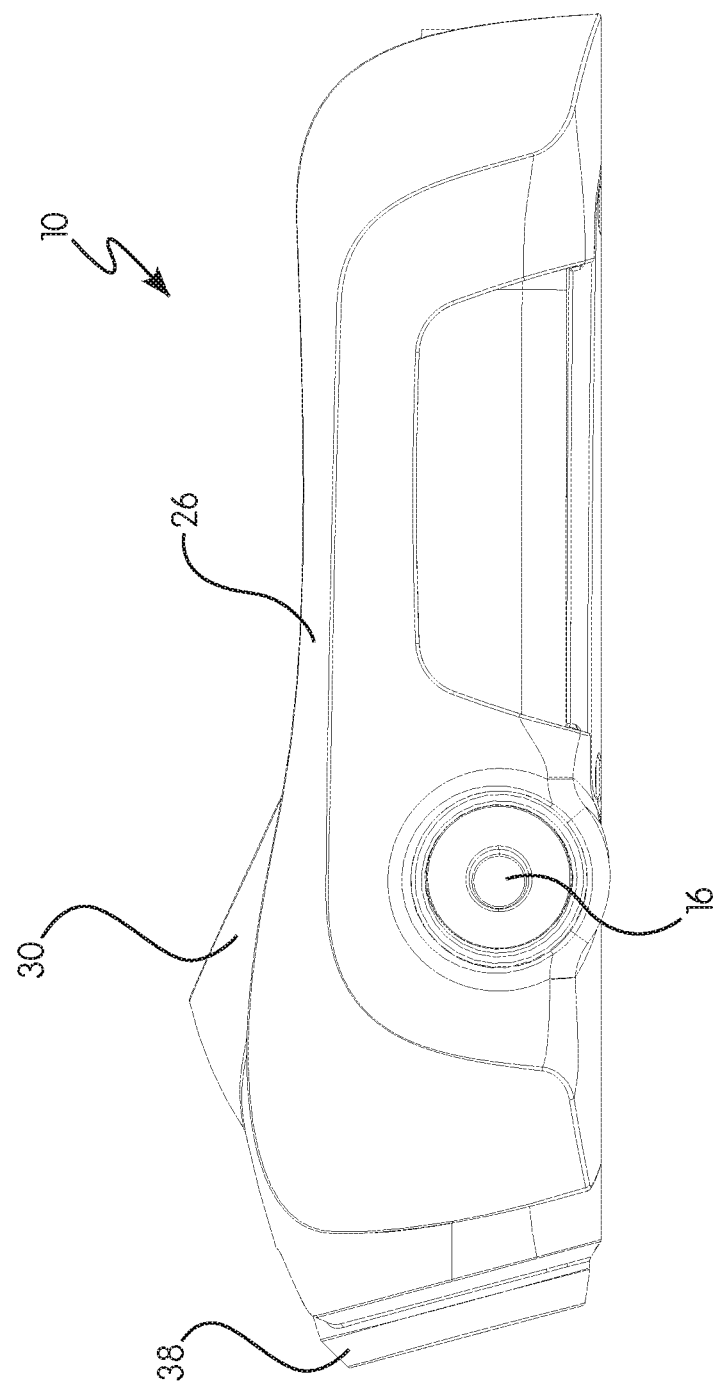
Figure 8:
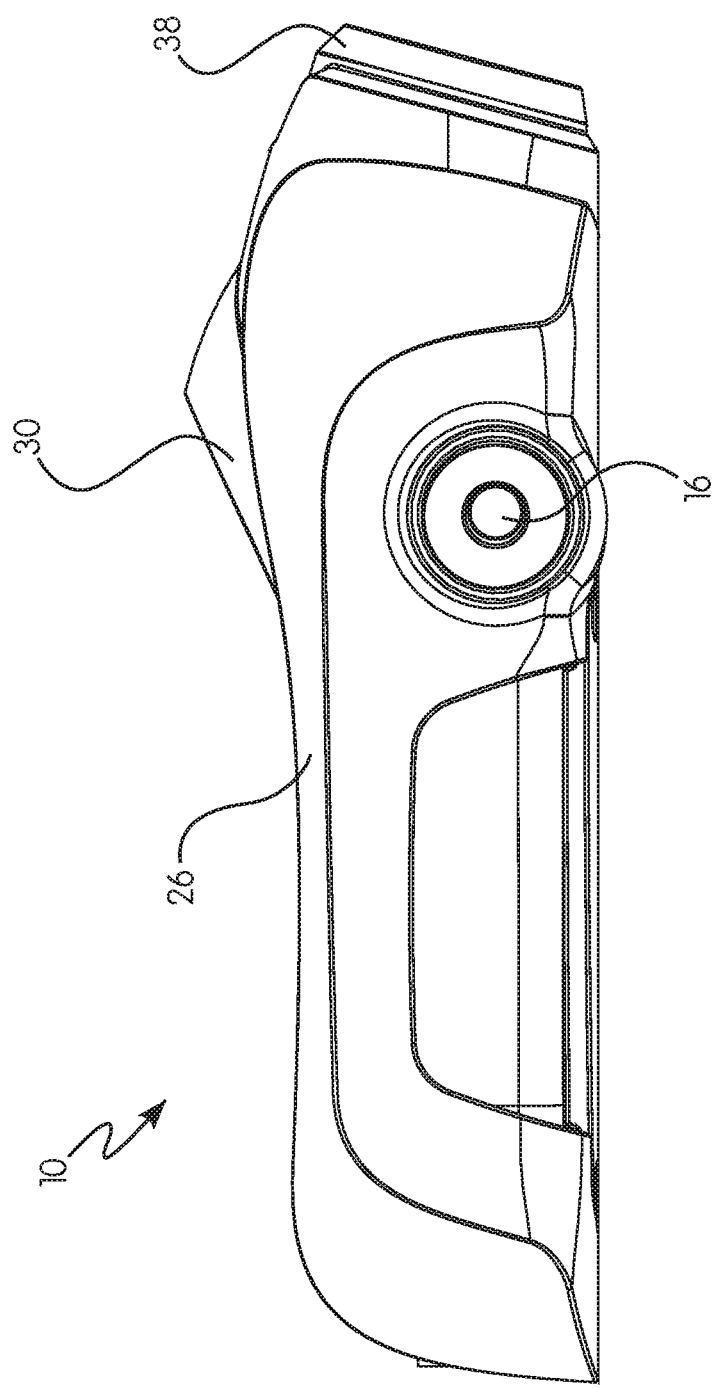
Figure 9:
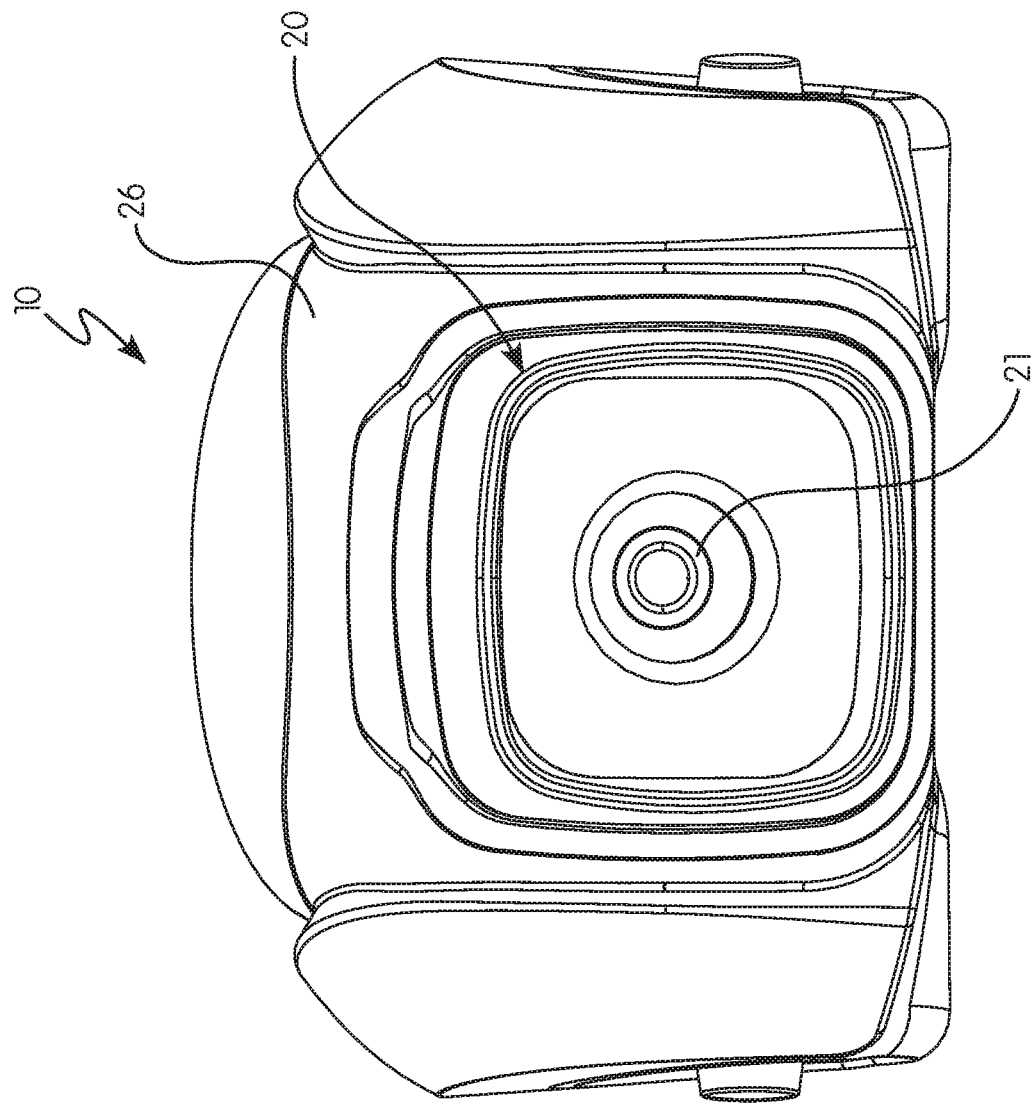
Figure 10:
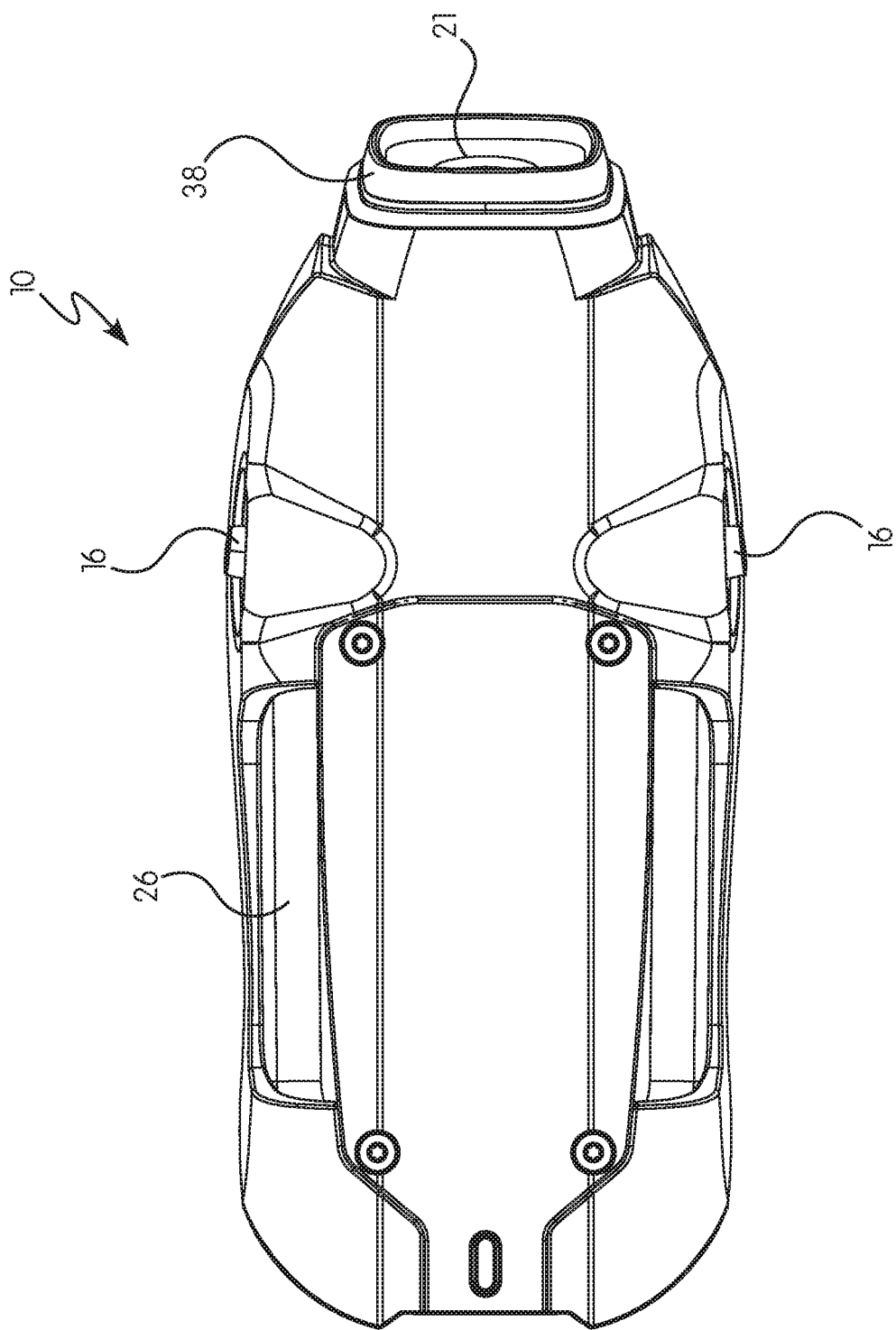
Figure 11:
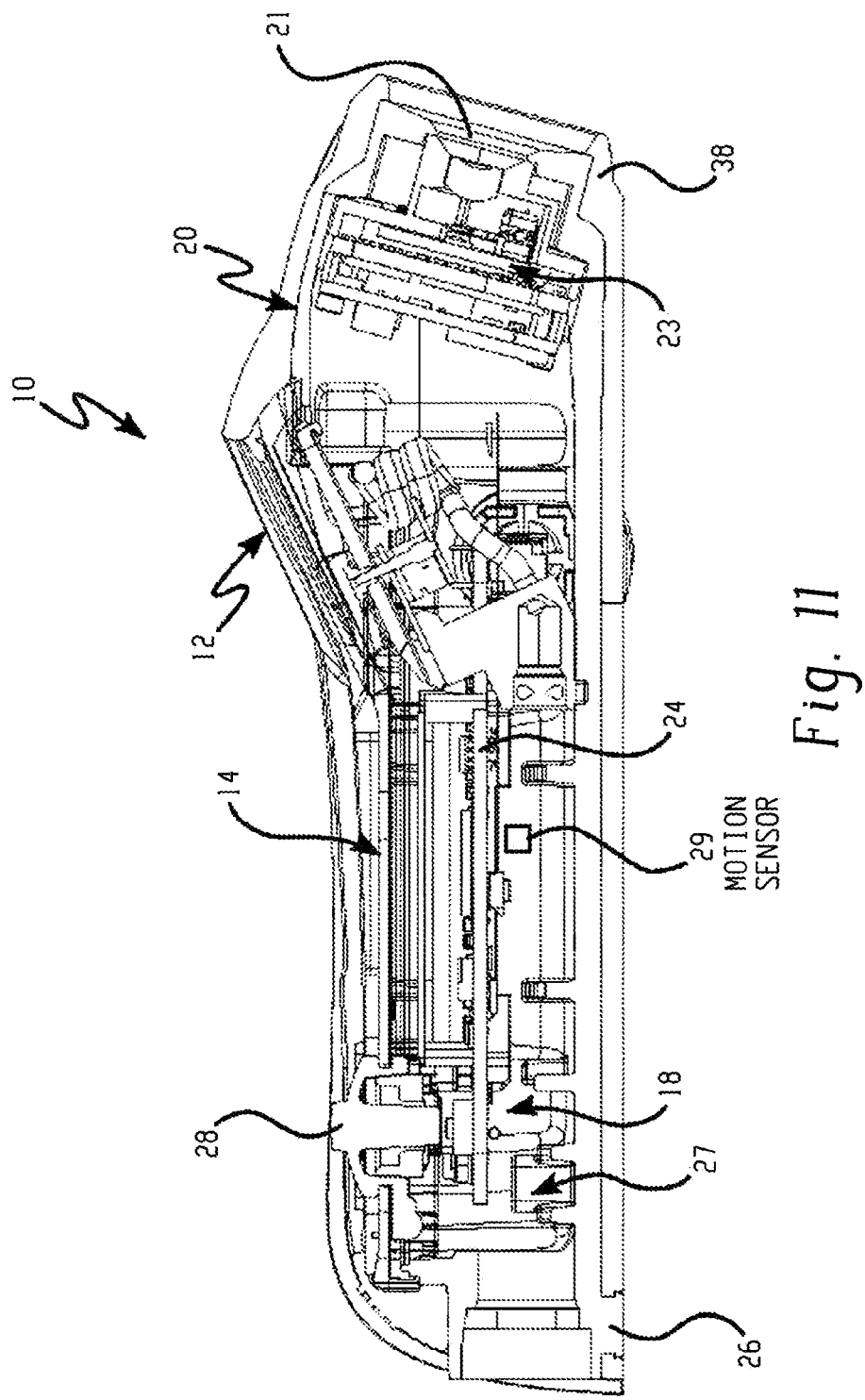
Figure 12:
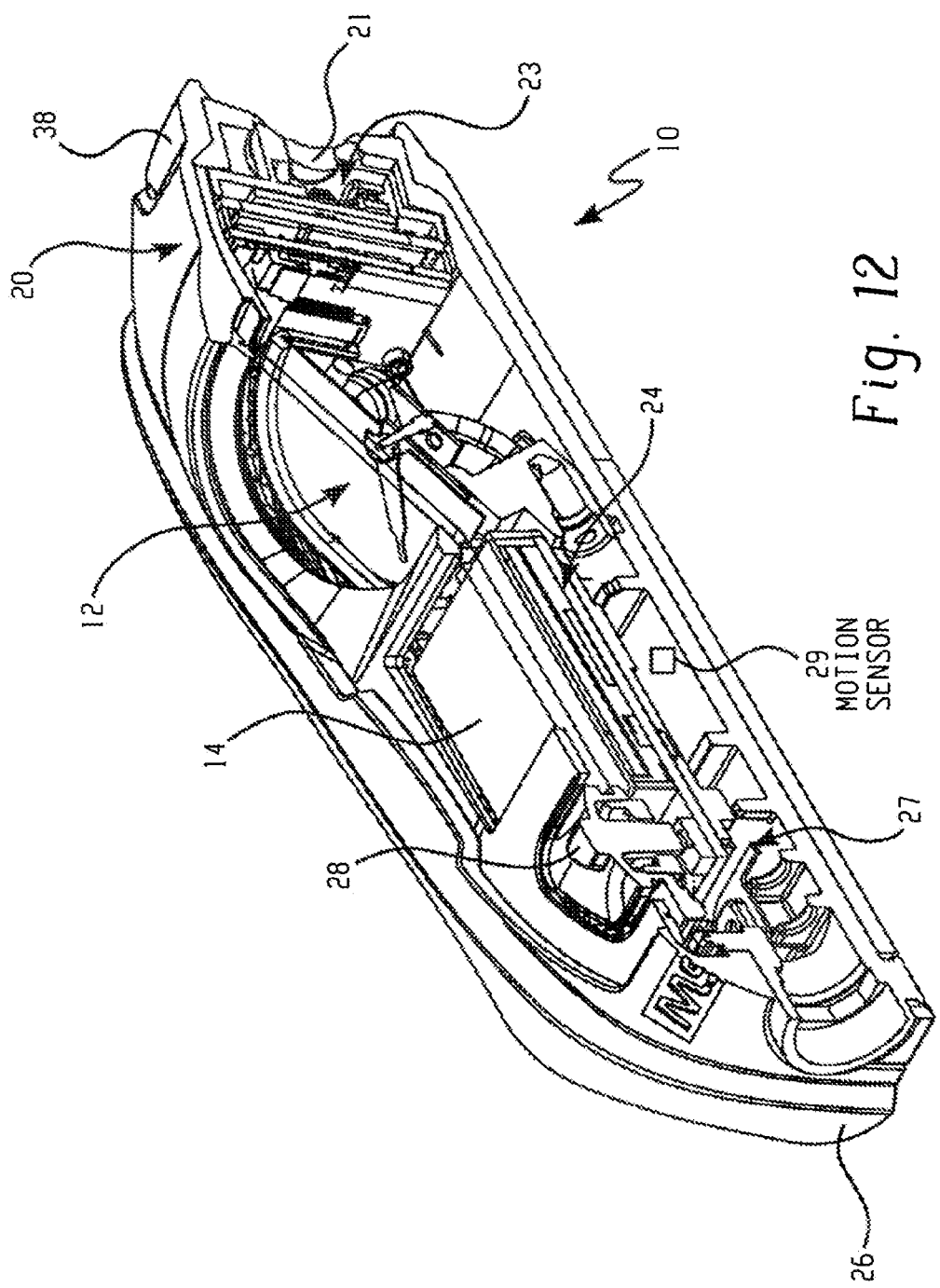
Figure 13:
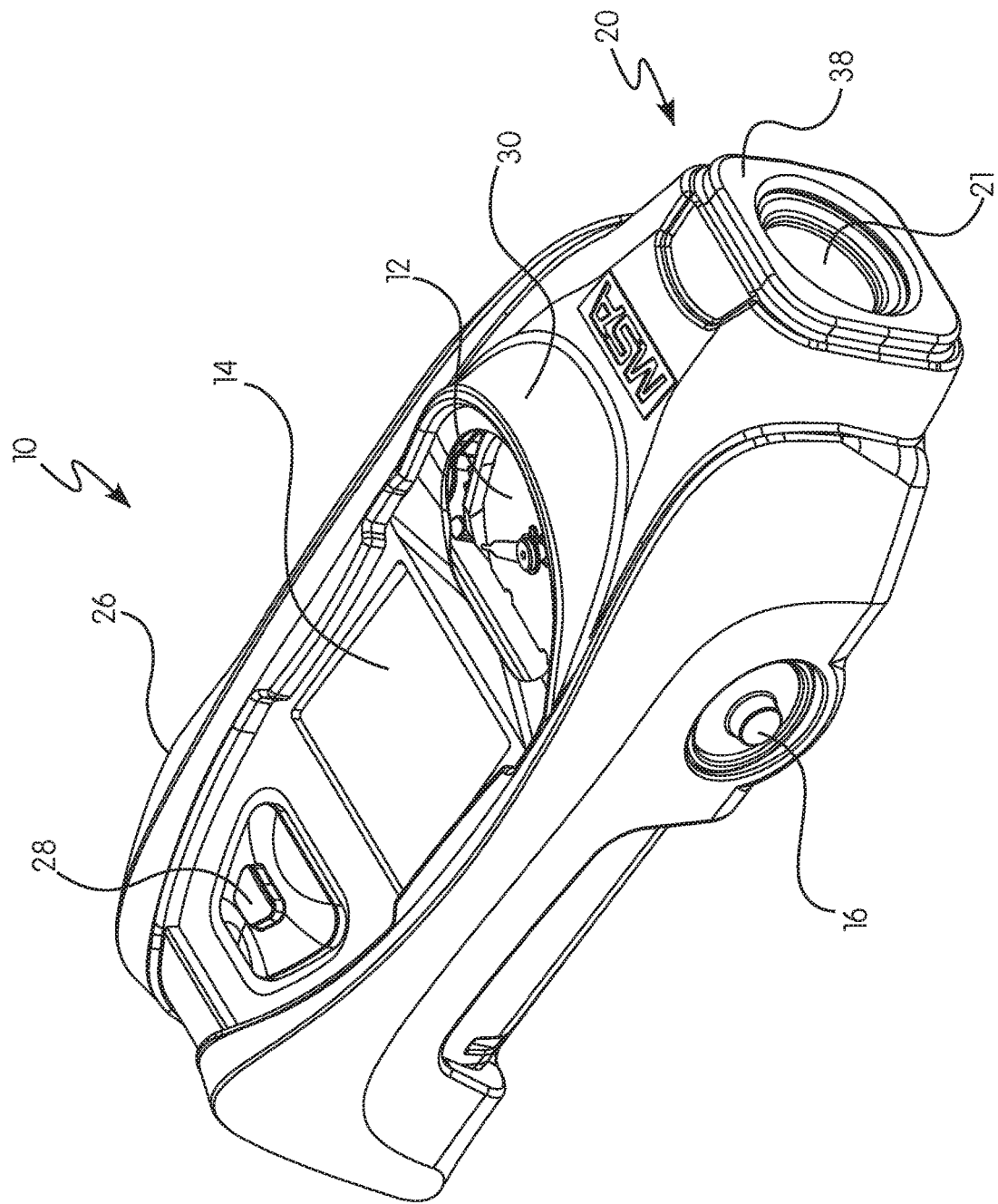
FIGS. 13-20 are isometric and cross sectional views of a still further embodiment of a safety device for a self-contained breathing apparatus according to the principles of the present invention.
Figure 14:
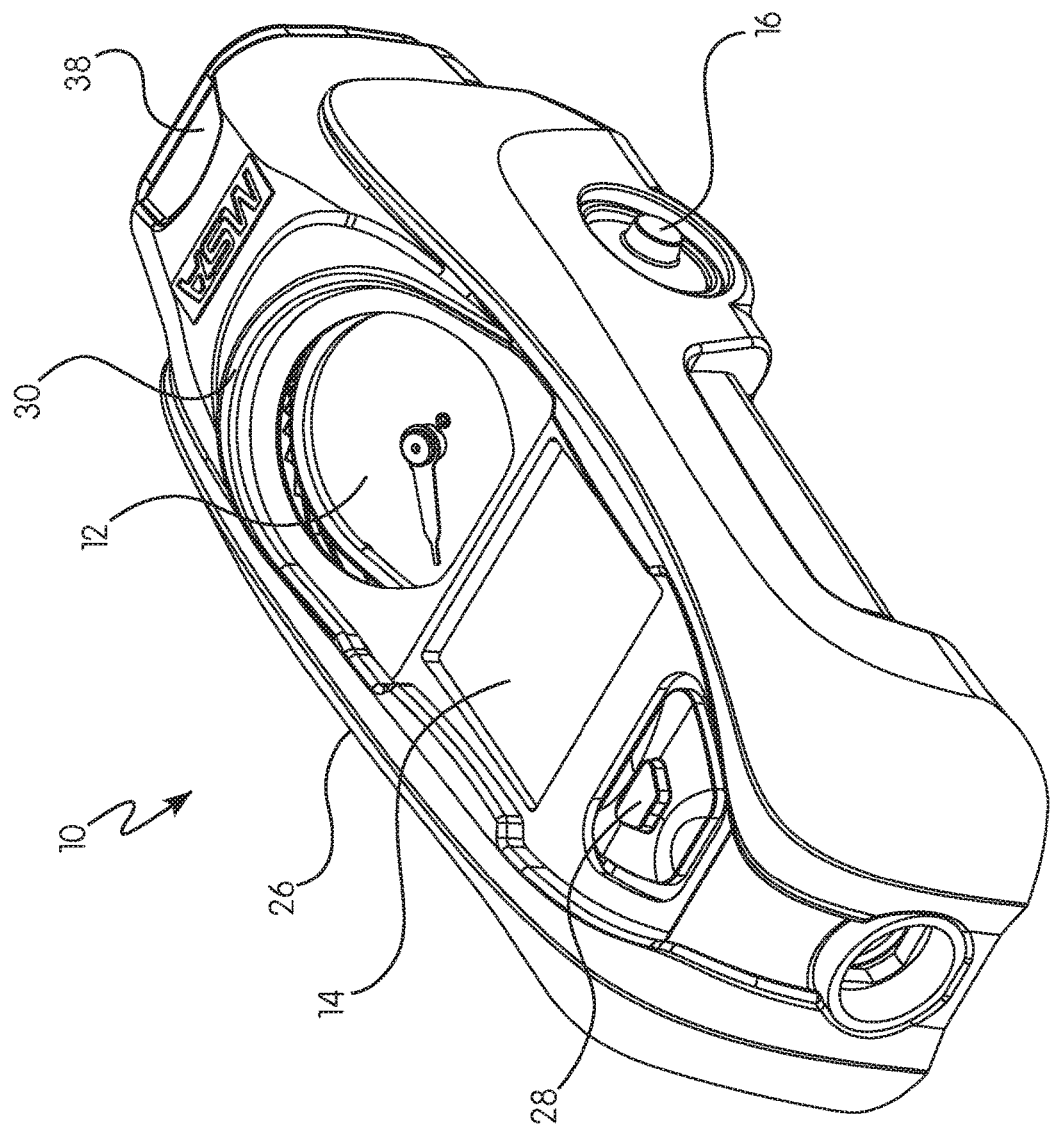
Figure 15:
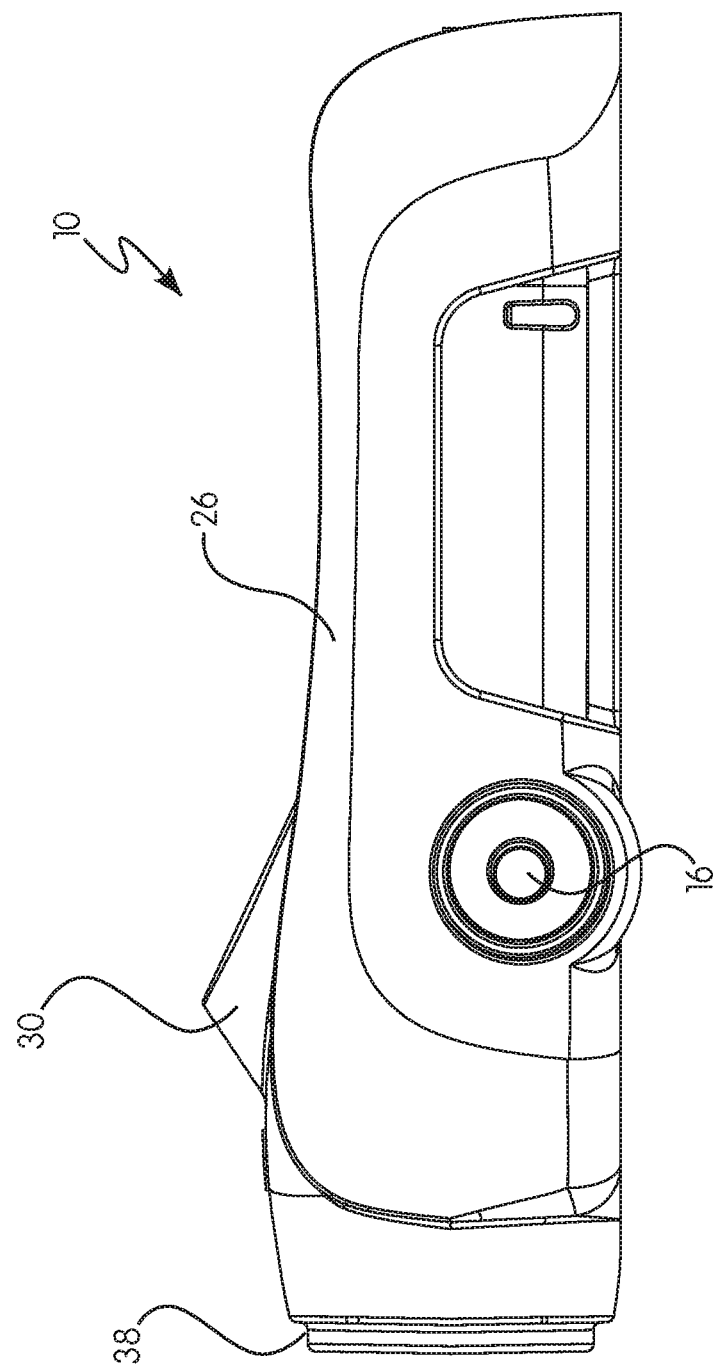
Figure 16:
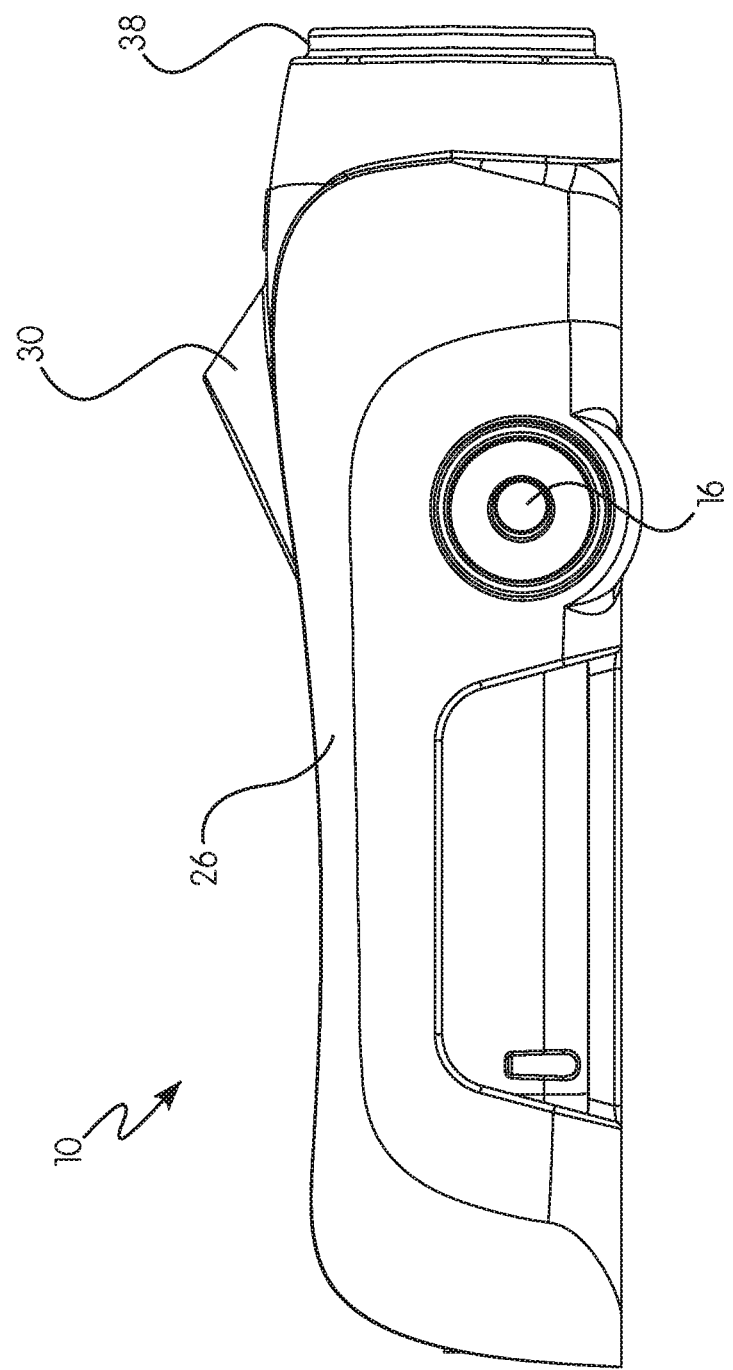
Figure 17:
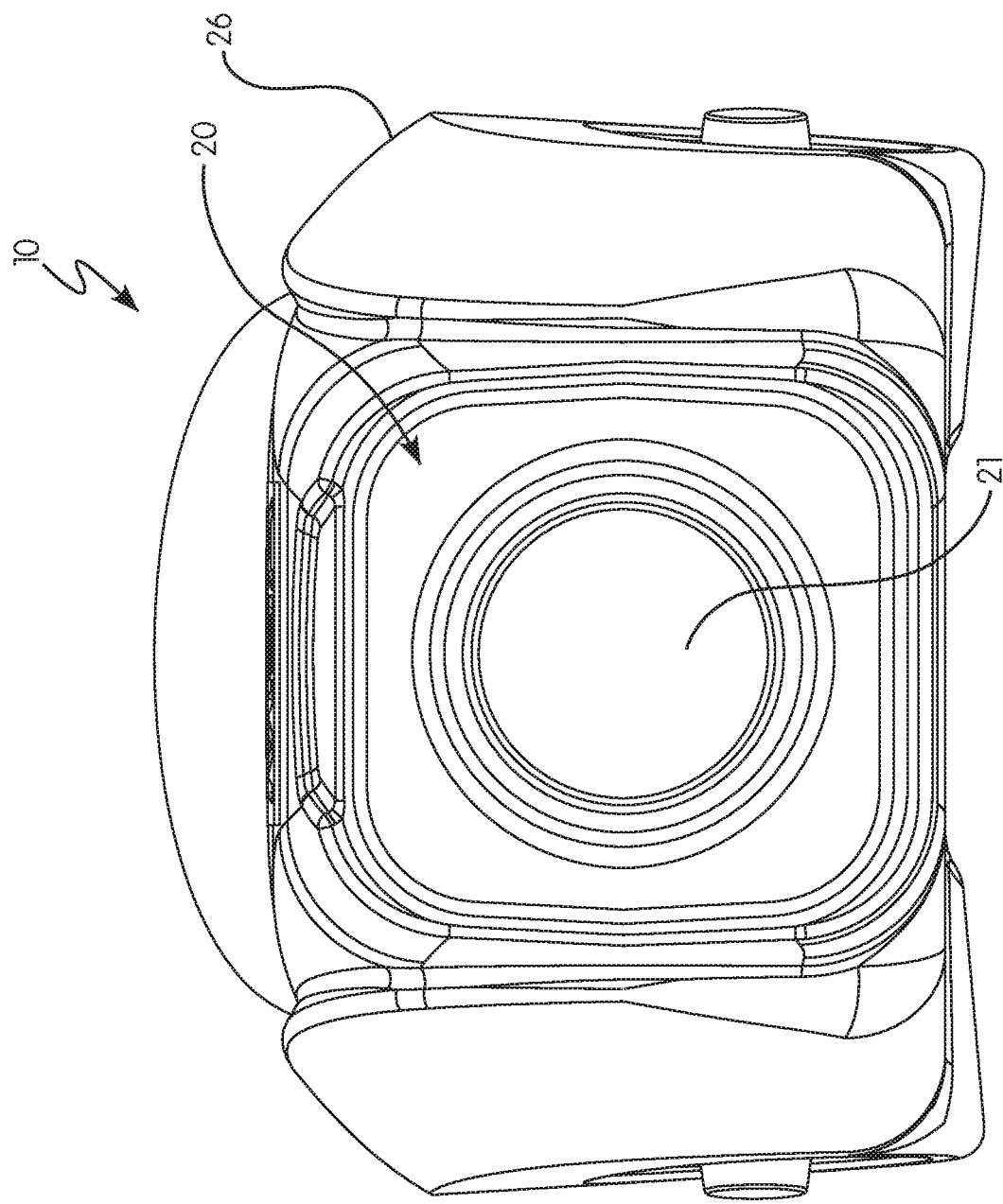
Figure 18:
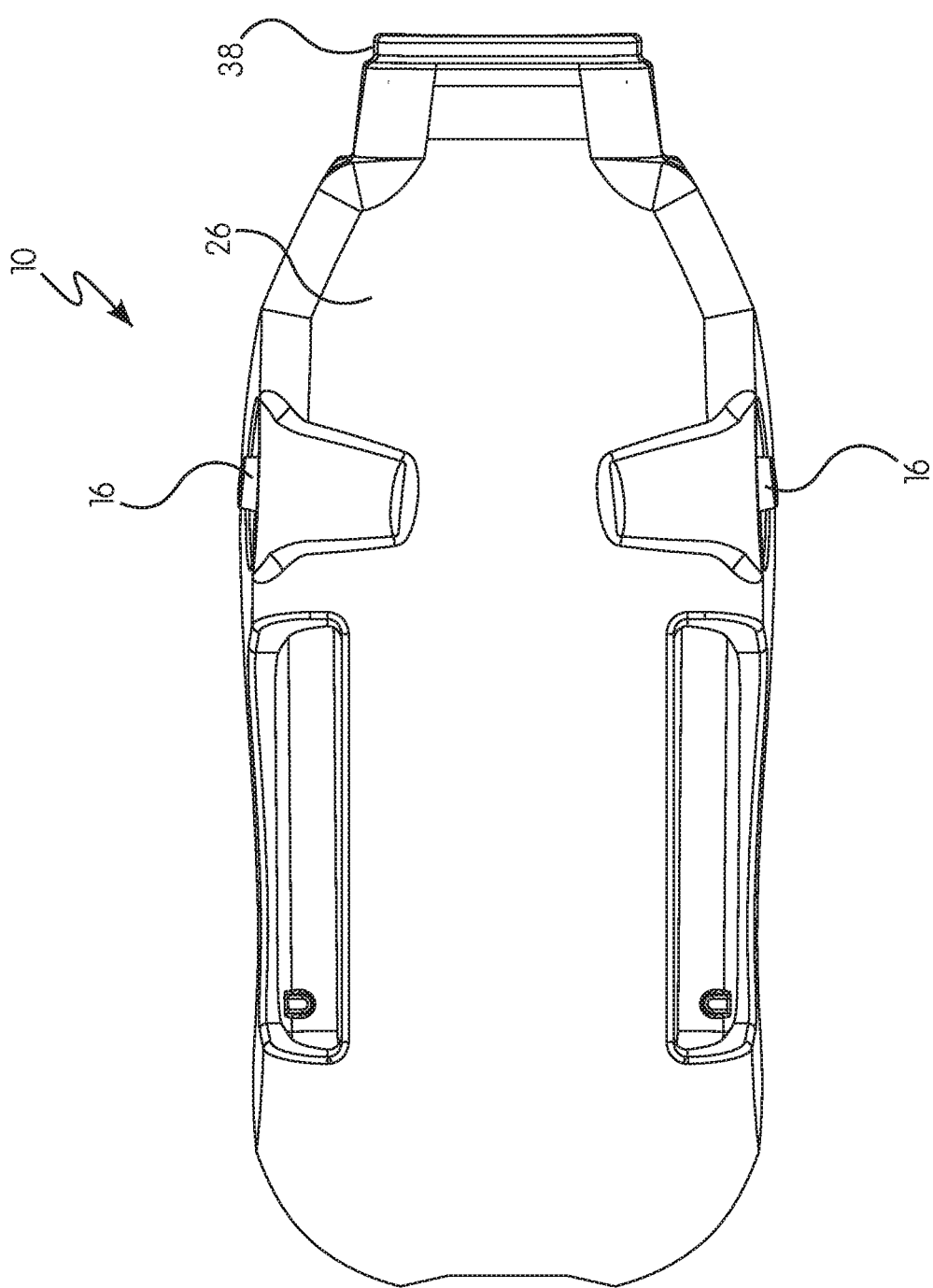
Figure 19:
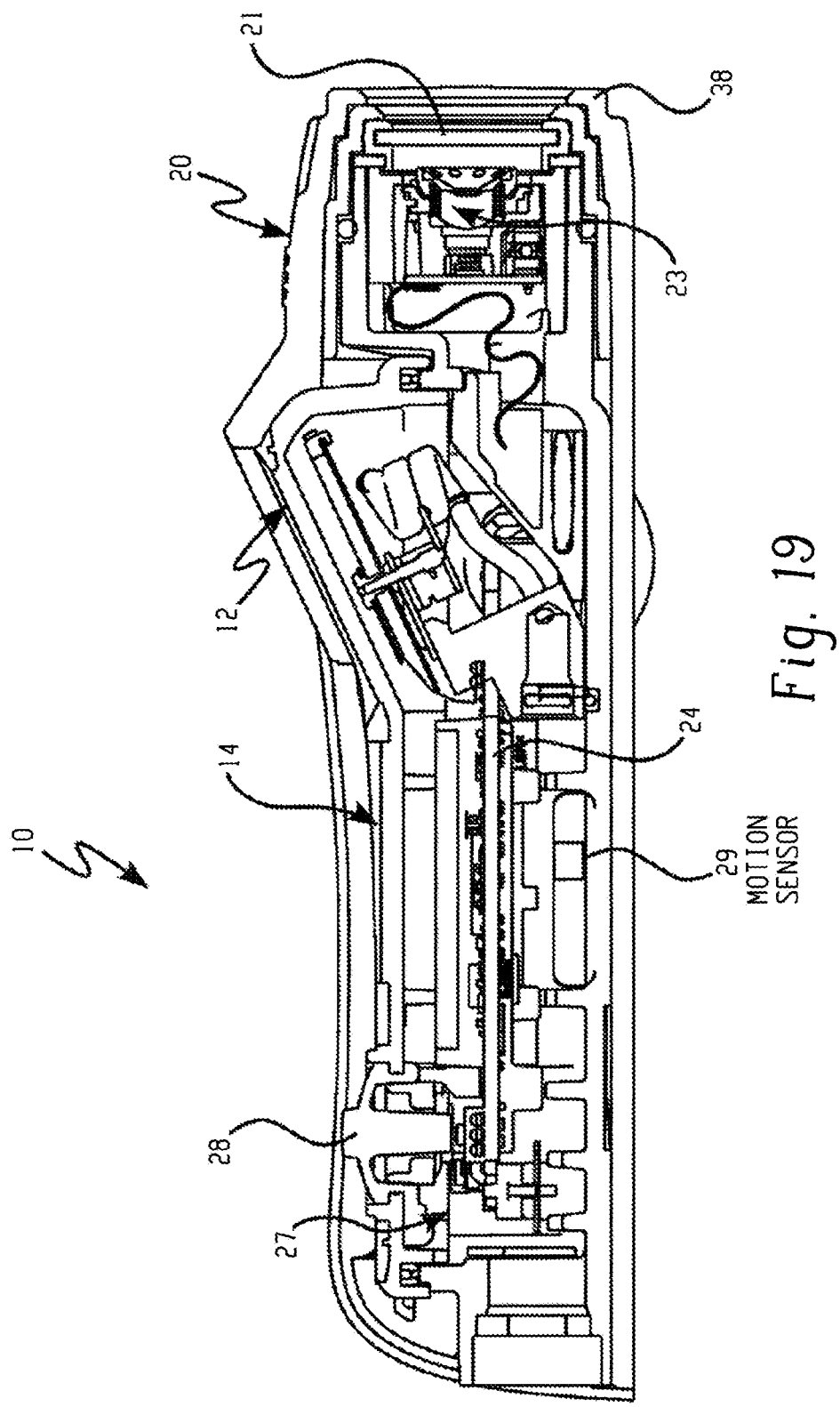
Figure 20:
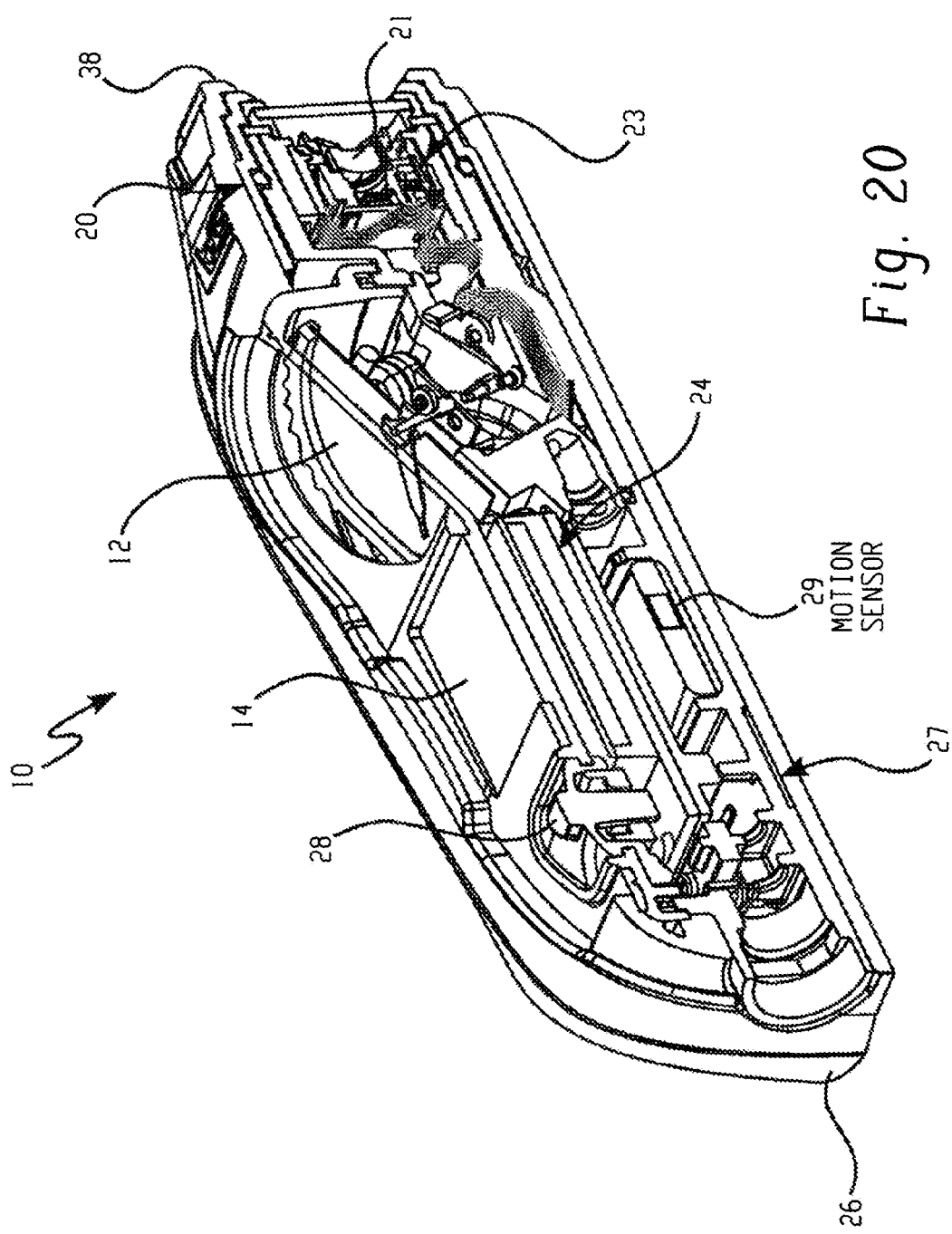

With reference to FIGS. 3 and 4, and in another preferred and non-limiting embodiment or aspect, one or more adjustment members 36 may be included that provide the user with the ability to manually adjust the angles X and/or Y to a desired position. These adjustment members 36 may take form of a rotatable knob, a ratchet device, a locking arrangement, a push-button arrangement, and/or the like, and further, these adjustment members 36 may be positioned at any area or location on the housing 26. Further, it is envisioned that the user may use the user interface 14 to move the lens 21 and/or adjust the field-of-view 22 to a desired position. As also illustrated in FIG. 4, a shield 38 may be included or integrated with the housing 26, wherein the shield 38 is positioned to at least partially surround the lens 21. Accordingly, the shield 38 will provide protection to the lens 21 as the user traverses a difficult environment, often on his or her hands and knees.

In one example, the user may view the safety device 10 (e.g., the air pressure gauge 12) at about a 30°-50° angle to the horizontal, while the user interface 14 (and, thus, the thermal imaging data) may be substantially planar to the horizontal, which results in a general angle of 45° of slope from the field-of-view 22 to the user interface 14. Accordingly, and in one preferred and non-limiting embodiment or aspect, it is the angle of the lens 21, i.e., the field-of-view 22, that can be optimized, whether rigidly (where the optimization is based upon the most typical viewing angles of the safety device 10) or adjustably (where the user may manually and/or automatically adjust the view angle, such as by using the adjustment member 36). Alternatively, the air pressure gauge 12 and/or the user interface 14 may be sloped or slanted at a specified angle with respect to the face 32 of the housing 26.

In another preferred and non-limiting embodiment or aspect, and when the information and data generated by or derived from the thermal imaging unit 20 and the information and data generated by or derived from other components of the SCBA (including the other components of the safety device 10) are displayed on the same user interface 14 (i.e., the same screen), the safety device 10, itself, may be used to toggle between the type of information and data displayed. For example, the processor 24 may be programmed or configured to change the specific information or data displayed (and/or the data stream) based at least partially on the output (or motion data) of the motion sensor 29. For example, the safety device 10 may be rotated through its longitudinal axis, which activates or impacts the motion sensor 29, and which movement may be used to switch between displays or modes. Of course, any type of movement of the safety device 10 may be sensed and translated into a variety of display changes and/or interactions. Movement between display modes or information- or data-types may be implemented using one or more of the control arrangements 16 discussed above. Further, it is envisioned that switching between display modes, interacting with the user interface 14, and/or control any of the components of the safety device 10 may occur through voice command, e.g., direct or indirect data communication between a transducer in the mask (M) and the safety device 10 and/or the control module (CM), such as through the communication device (CD).

In a still further preferred and non-limiting embodiment or aspect, the motion sensor 29 may be used to determine the orientation of the safety device 10. It is recognized that a color user interface 14 (which would be beneficial for effectively viewing the thermal imaging data) may increase usage of the power device (PD), e.g., the battery. Accordingly, in this embodiment, and to minimize the loss of power when not in use, the user interface 14 may be temporarily shut down (or go in to some "low power" state) when the safety device 10 is in a non-use orientation, e.g., pointing down and away from the user. This "shut down" function may also occur only when the safety device 10 is in a non-use orientation for a specified period of time. Alternatively, if certain components of the safety device 10 are static or unused for a specified period of time, this "shut down" function may also be implemented. Further, a simple movement of the safety device 10 (e.g, twisting the device, as discussed above), orientation of the safety device 10 (e.g., positioning the device in a "viewing" angle), and/or other specified interaction with the safety device 10 (e.g., interacting with the control arrangement 16) may cause the user interface 14 to power up. In another preferred and non-limiting embodiment or aspect, the user interface 14 can be utilized in both modes simultaneously, such as where the general SCBA information or data is overlaid on the thermal imaging data.

Accordingly, and in one preferred and non-limiting embodiment or aspect, the at least one processor 24 is programmed or configured to initiate at least one of a no-power or low-power state based at least partially on at least one of the following: a specified movement of the user, a voice command of the user, a specified orientation of the safety device 10, a specified period of a specified orientation, a specified period of non-use or non-interaction, a specified period of non-use or non-interaction of a specified component of the safety device 10, or any combination thereof. Further, the at least one processor 24 may be programmed or configured to initiate a power or power-up state based at least partially on at least one of the following: a specified movement of the user, a voice command of the user, a specified orientation of the safety device 10, a specified period of a specified orientation, use of or interaction with the safety device 10, use of or interaction with a specified component of the safety device 10, or any combination thereof.

In another preferred and non-limiting embodiment, the safety device 10 is in direct or indirect communication with one or more of the communication devices (CD) (e.g., a short-range radio, a long-range radio, and/or the like). In particular, some or all of the thermal imaging data (whether in raw or processed form) can be transmitted to a central controller, such as a command and control base station. This thermal imaging data may be sent continuously, periodically, on command, as a "live" stream, and/or the like. This would allow a remote user, e.g., the fire chief or other personnel, to view the thermal imaging data from the safety device 10 without the need for additional radio communication links, such as would be required for existing handheld thermal imaging cameras. While it is recognized that such a telemetry arrangement would require higher bandwidth than normal existing communications, this embodiment would represent an intrinsically safe and explosion-proof telemetry methodology.

It is further recognized that the environments at or around the scene are often a noisy place, and with additional head protection and communications partially or fully covering the ears of the user, hearing or determining the location or direction of an alarm condition of a specific safety device 10 can be difficult. With reference to FIG. 4, and in another preferred and non-limiting embodiment or aspect, one or more infrared light emitting members 40 (e.g., strobe lights) may be positioned on the housing 26 and configured to emit infrared light, which may be received by or sensed by another safety device 10 of another user. In this embodiment, the thermal imaging unit 20 of another safety device 10 of another user can be used to search for the infrared light emitted from these infrared light emitting members 40. Therefore, the safety device 10 that is in an alarm condition, e.g., the user is in distress, can be more easily located by other users/rescuers. In addition, it is envisioned that the strength of the infrared signal from the infrared light emitting members 40 can be used to determine the distance or proximity to the downed person. Still further, these infrared light emitting members 40 may be configured to emit infrared light in a strobe pattern, a specified pattern, a configurable pattern, a user-controlled pattern, and/or the like. By using varying patterns, additional information or data may be conveyed between the safety devices 10, which may be indicative of different states, e.g., in an alarm state, proximity to a dangerous environment, and/or any other information or data generated by or stored on the safety device 10.

One preferred and non-limiting embodiment or aspect of a safety device 10 in accordance with the principles of the present invention is illustrated in FIGS. 5-12, where the at least one lens 21 is oriented at a downward angle with respect to the horizontal length of the housing 26, and another preferred and non-limiting embodiment or aspect of a safety device in accordance with the principles of the present invention is illustrated in FIGS. 13-20, where the at least one lens 21 is oriented parallel (i.e., 0°) with respect to the horizontal length of the housing 26. In this manner, provided is an improved safety device 10 for an SCBA, as well as an improved SCBA.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A safety device for a self-contained breathing apparatus, the safety device comprising:
a housing configured to be hand-held by the user;
an air pressure gauge at least partially contained in the housing and configured to indicate air pressure information or data to the user; and
a thermal imaging unit at least partially contained in the housing and comprising: (i) at least one lens having a field-of-view; and (ii) at least one thermal sensor configured to output signals representative of thermal energy,
wherein the at least one lens of the thermal imaging unit is rigidly mounted to the housing at a fixed angle of 30°-50° relative to a horizontal plane extending through a longitudinal length of the housing.

2. The safety device of claim 1, further comprising a user interface positioned on the housing and programmed or configured to display information or data to the user.

3. The safety device of claim 2, wherein the information or data displayed on the user interface is modifiable by at least one of the following: a movement of the safety device, a voice command, or any combination thereof.

4. The safety device of claim 1, further comprising at least one local or remote processor programmed or configured to directly or indirectly communicate with and/or control at least one of the air pressure gauge and or the thermal imaging unit.

5. The safety device of claim 4, wherein the at least one local or remote processor is programmed or configured to initiate at least one of a no-power or low-power state based at least partially on at least one of the following: a specified movement of the user, a voice command of the user, a specified orientation of the safety device, a specified period of a specified orientation, a specified period of non-use or non-interaction, a specified period of non-use or non-interaction of a specified component of the safety device, or any combination thereof.

6. The safety device of claim 4, wherein the at least one local or remote processor is programmed or configured to initiate a power-on or power-up state based at least partially on at least one of the following: a specified movement of the user, a voice command of the user, a specified orientation of the safety device, a specified period of a specified orientation, use of or interaction with the safety device, use of or interaction with a specified component of the safety device, or any combination thereof.

7. The safety device of claim 4, wherein the at least one processor comprises at least one of the following: a processor of the safety device, a processor of the thermal imaging unit, a remote processor in direct or indirect communication with the safety device, a processor of at least one component of the self-contained breathing apparatus, and a processor of a control module of the self-contained breathing apparatus.

8. The safety device of claim 1, further comprising at least one alarm system programmed or configured to generate alarm data based upon input data from at least one of the following: at least one component of the self-contained breathing apparatus, at least one component of the safety device, or any combination thereof.

9. The safety device of claim 8, wherein the at least one alarm system comprises at least one alarm member comprising at least one of the following: a structural element configured to receive input from the user to generate alarm data, a lighting element configured to provide visual alarm data to the at least one user when in an alarm mode, a speaker element configured to provide aural alarm data to the at least one user when in alarm mode, or any combination thereof.

10. The safety device of claim 8, further comprising at least one motion sensor programmed or configured to generate motion data, wherein, based at least partially on the motion data, the at least one alarm system is configured to at least one of enter an alarm mode and generate alarm data.

11. The safety device of claim 8, wherein, based at least partially on the output signals from the thermal imaging unit, the at least one alarm system is configured to at least one of enter an alarm mode or generate alarm data.

12. The safety device of claim 1, further comprising at least one infrared light emitting member configured to emit infrared light that is receivable or detectable by a second device.

13. The safety device of claim 12, wherein the infrared light is emitted in at least one of the following: a strobe pattern, a specified pattern, a configurable pattern, a user-controlled pattern, or any combination thereof.

14. The safety device of claim 1, further comprising at least one control element programmed or configured to facilitate direct or indirect interaction with or control of at least one component of the safety device.

15. The safety device of claim 1, further comprising at least one communication interface programmed or configured to transmit, receive, and/or process signals in at least one of the following manners: directly, indirectly, wirelessly, over a communication line, or any combination thereof.

16. The safety device of claim 15, further comprising at least one local processor programmed or configured to process and transmit, via the at least one communication interface, at least one of the following: thermal imaging data, alarm data, alarm mode data, motion data, safety device data, user data, or any combination thereof.

17. The safety device of claim 1, wherein the housing has at least one wall or rim at least partially surrounding at least one of the following: the air pressure gauge, at least one control element programmed or configured to facilitate direct or indirect interaction with or control of at least one component of the safety device, or any combination thereof.

18. The safety device of claim 1, wherein the housing has at least one shield configured to at least partially surround the at least one lens.

19. A self-contained breathing apparatus, comprising:
at least one air cylinder configured to deliver regulated air through an air hose via a first regulator;
a mask configured to be worn by a user, the mask having a second regulator configured to deliver air from an air hose to an internal area of the mask; and
a safety device comprising:
a housing configured to be hand-held by the user;
an air pressure gauge at least partially contained in the housing and configured to indicate air pressure information or data to the user; and
a thermal imaging unit at least partially contained in the housing and comprising: (i) at least one lens having a field-of-view; and (ii) at least one thermal sensor configured to output signals representative of thermal energy,
wherein the at least one lens of the thermal imaging unit is rigidly mounted to the housing at a fixed angle of 30°-50° relative to a horizontal plane extending through a longitudinal length of the housing.

20. The self-contained breathing apparatus of claim 19, further comprising a control module having: (i) a power device configured to provide power to at least one component of the self-contained breathing apparatus; (ii) a processor programmed or configured to communicate with and/or control at least one component of the self-contained breathing apparatus; and (iii) a communication device programmed or configured to facilitate direct and/or indirect, wired and/or wireless data communications between the processor and the at least one component of the self-contained breathing apparatus.

\* \* \* \* \*